US011720910B2

(12) United States Patent
Rabison et al.

(10) Patent No.: US 11,720,910 B2
(45) Date of Patent: Aug. 8, 2023

(54) SYSTEM AND METHOD FOR CUSTOMER BEHAVIORAL LOAD SHAPING FOR ADJUSTING CUSTOMER ENERGY CONSUMPTION

(71) Applicant: ORACLE INTERNATIONAL CORPORATION, Redwood Shores, CA (US)

(72) Inventors: Rebecca Rabison, San Francisco, CA (US); Priya Kurani, San Francisco, CA (US); Moiz Kapadia, San Francisco, CA (US); Kostiantyn Kugot, Odessa (UA)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 384 days.

(21) Appl. No.: 16/658,836

(22) Filed: Oct. 21, 2019

(65) Prior Publication Data

US 2020/0126103 A1    Apr. 23, 2020

Related U.S. Application Data

(60) Provisional application No. 62/748,833, filed on Oct. 22, 2018.

(51) Int. Cl.
*G06Q 30/02* (2023.01)
*G06Q 30/0201* (2023.01)
(Continued)

(52) U.S. Cl.
CPC ... *G06Q 30/0206* (2013.01); *G06Q 10/06315* (2013.01); *G06Q 30/04* (2013.01);
(Continued)

(58) Field of Classification Search
None
See application file for complete search history.

(56) References Cited

U.S. PATENT DOCUMENTS

2012/0101653 A1* 4/2012 Tran ................ G01D 4/004
700/296
2016/0140586 A1* 5/2016 Liptsey-Rahe .... G06Q 30/0202
705/7.31

(Continued)

*Primary Examiner* — Alan Torrico-Lopez
(74) *Attorney, Agent, or Firm* — Kraguljac Law Group, LLC

(57) ABSTRACT

A behavioral load shaping (BLS) system can be implemented to encourage consumer reductions in resource consumption. To accomplish this, consumption reports detailing resource consumption can be generated and transmitted to consumers to encourage resource consumption. A series of resource consumption reports can be generated and transmitted to consumers at regular time intervals throughout a calendar year informing the consumer of the rates the consumer is being charged for peak hour and non-peak hour resource consumption. To encourage the consumer to reduce their resource consumption, especially during peak hours, the resource consumption report can include information or insights as to how the consumer can reduce his/her resource consumption especially during peak hours. The resource reports can also include information regarding changes in the peak hours and non-peak hours. The resource reports can also inform the consumer that the consumer is about to exceed a high resource bill threshold.

19 Claims, 11 Drawing Sheets

(51) Int. Cl.
*G06Q 10/0631* (2023.01)
*G06Q 30/04* (2012.01)
*H02J 3/12* (2006.01)
G06Q 50/06 (2012.01)
H02J 3/00 (2006.01)

(52) U.S. Cl.
CPC ............... *H02J 3/12* (2013.01); *G06Q 50/06* (2013.01); *H02J 3/003* (2020.01); *H02J 2310/64* (2020.01)

(56) References Cited

U.S. PATENT DOCUMENTS

2020/0118223 A1* 4/2020 Singh .................... G06F 40/117
2020/0184395 A1* 6/2020 Fabris .............. G06Q 10/06315
2020/0402670 A1* 12/2020 Bull ....................... G06Q 10/10

\* cited by examiner

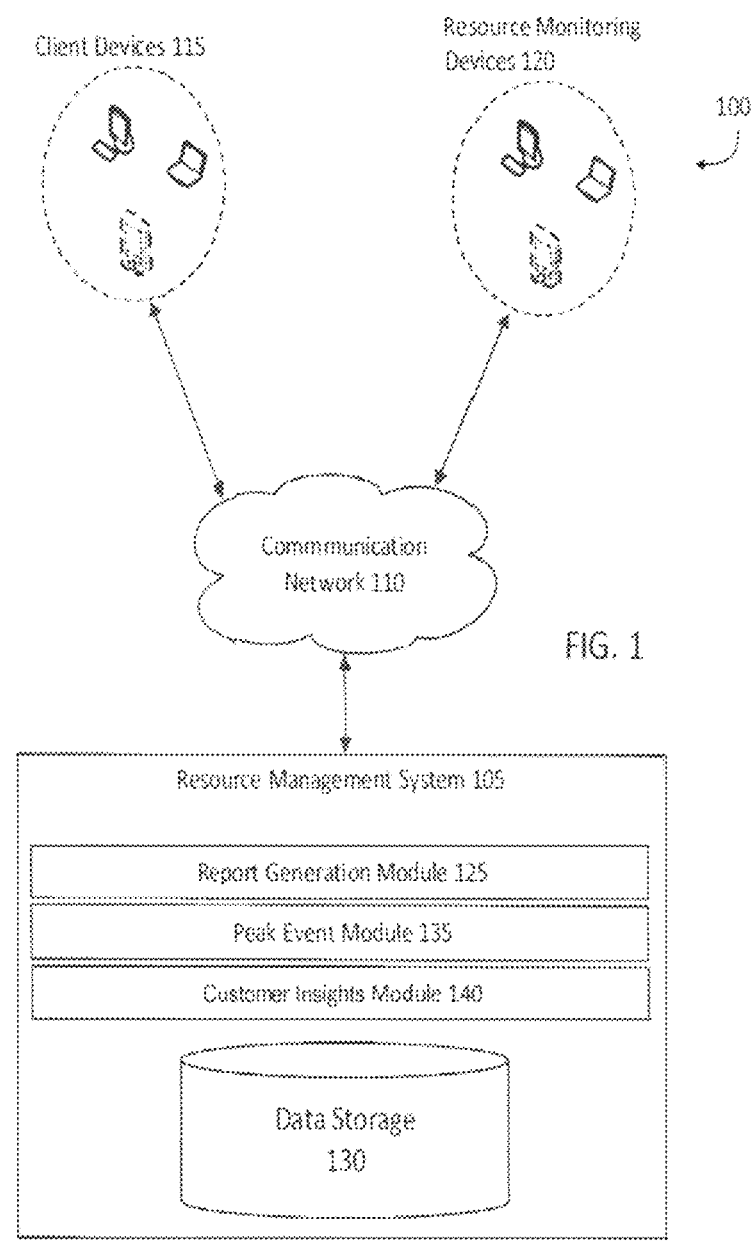

Welcome to your Rate Coach, a weekly email designed to help you save the most money on your rate plan! ← 205

You're currently on a plan that charges different hourly rates throughout the day. We want to help you save money by using less electricity when it's most expensive. ← 210

On weekdays, electricity is 1.5x more expensive from 4pm-9pm ← 215

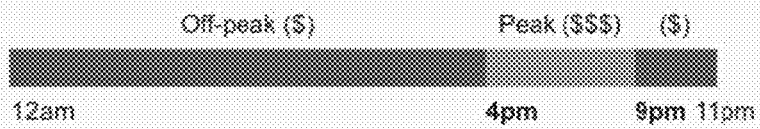

Here's how you used electricity this week

What parts of your routine could you do at off-peak times?

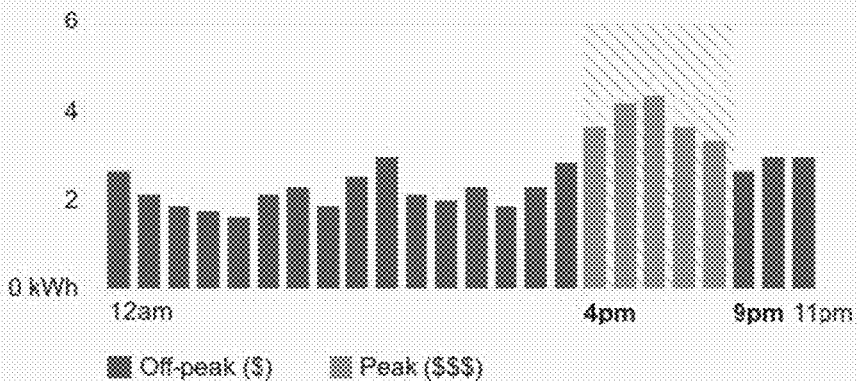 ← 220

This data is based on your average weekday electricity use in the last week.

How can you save big during peak hours?

Appliances like these use a lot of energy. By using them at lower-priced, off-peak times, you'll see more savings. ← 230

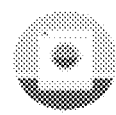   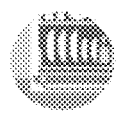

Washer/Dryer   Pool Pump   Air Conditioner   Dishwasher

FIG. 2

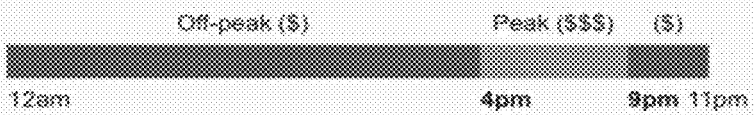
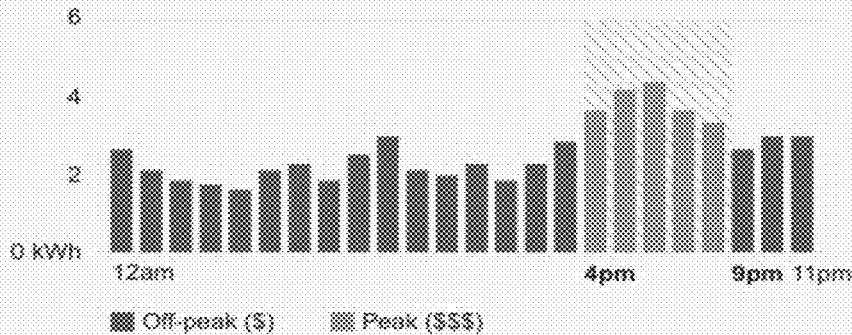
FIG. 3

Coming Soon: changes to peak hours and pricing
Starting June 1, peak hours and pricing will change for the new-season. To save more, try to avoid using high-energy user appliances during peak hours.
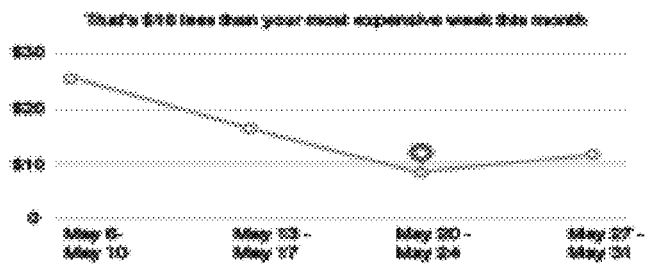
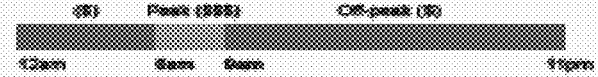
Your peak electricity costs
This data is based on your electricity use over the last 4 weeks.
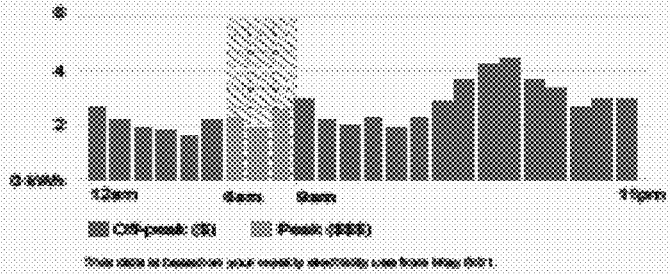
FIG. 4

Here are the new peak hours and pricing

As of June 1, peak hours and pricing have changed for the new season. To save more, try to avoid using high-energy use appliances during peak hours. ← 505

|  | Current | Old |
|---|---|---|
| Dates | June 1 - Sept 30 | Oct 1 - May 30 |
| Peak hours | 4pm - 9pm | 8am - 9am |
| Price difference | 1.5x | 1.8x |

← 510

On weekdays, electricity is 1.5x more expensive from 4pm-9pm

Off peak ($)   Peak ($$$)   ($)

12am    4pm    9pm 11pm

← 515

How can you save big during peak hours?

Appliances like these use a lot of energy. By using them at lower-priced, off-peak times, you'll see more savings.

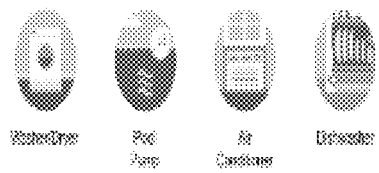

Washer/Dryer   Pool Pump   Air Conditioner   Dishwasher

Your bill is projected to be $234.42 ← 700, 705

⚠ That's $52.42 more than the same time last year.

What you spent of electricity — 710

Peak hours are 1.5x more expensive than off-peak hours.

| | | | |
|---|---|---|---|
| $ | Off-peak | 12am – 3pm<br>15 hours | $105 |
| ● | Peak | 3pm – 8pm<br>5 hours | $71 |
| $ | Off-peak | 8pm – 12am<br>4 hours | $44 |

Based on your weekday electricity use between July 9, 2018-July 23, 2018.

SEE MORE ELECTRICITY TRENDS

Warmer weather may have affected your energy use — 720

Energy use tends to be higher on warmer days.

On average, this month was 13°F hotter than the same time last year.

Ways to save

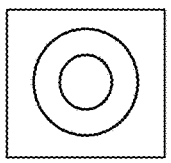

Raise your thermostat a few degrees — 730
Cooling can account for a large portion of your home's summer energy use. To save energy and money, set your thermostat to 78°F when you're home and raise the temperature by 10°F when you're away and 4°F before bed.

Save up to $75 for every degree you adjust

FIG. 7

SYSTEM AND METHOD FOR CUSTOMER BEHAVIORAL LOAD SHAPING FOR ADJUSTING CUSTOMER ENERGY CONSUMPTION

CROSS-REFERENCE TO RELATED APPLICATIONS

This disclosure claims the benefit of U.S. Provisional Patent Application Ser. No. 62/748,833, filed on Oct. 22, 2018, titled "Behavioral Load Shaping For Adjusting Energy Usage", and assigned to the present assignee, the disclosure of which is hereby incorporated by reference in its entirety.

BACKGROUND

The subject technology generally relates to behavioral load shaping for adjusting customer resource consumption such as energy (electricity) consumption.

Due to the high cost of residential, commercial and industrial utilities such as electricity, water and sewer, utility customers are interested in understanding how they can lower their utility bills by making their homes and/or businesses more efficient in terms of how their homes and businesses consume/use the utilities. For example, it would be beneficial to the customer to know how much electricity the customer is using at his home during the monthly billing cycle especially during peak hours. Also, the customer may want to know the amount of other utilities such as water and sewer that the customer's business uses during a calendar year. Finally, the customer may also desire suggestions (insights) from the utility provider as to how the customer can reduce his/her utility usage and utility bills.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In a first aspect, a system is provided. The system comprises a computer processor, and a memory storing instructions. The instructions, when executed by the computer processor, cause the computer processor to: receive resource consumption data for a consumer of a resource, wherein the resource consumption data includes information regarding a current billing amount that the consumer was charged for consumption of the resource, a peak hours rate and a peak hours' time range, and a non-peak hours rate and a non-peak hours' time range for consumption of the resource by the consumer over a time interval; generate a first resource consumption report of a series of coordinated resource consumption reports for transmission to the consumer, wherein the first resource consumption report (i) includes information related to a comparison of how much resource the consumer used during the peak hours' time range during a first time period and during a second time period, and (ii) includes a first set of suggestions for reducing resource usage during the peak hours' time range, wherein the processor is configured to select the first set of suggestions from an available set of suggestions stored in the memory, wherein each suggestion includes a different suggestion for reducing resource consumption; transmit the first resource consumption report to a location associated with the consumer; subsequent to the transmission of the first resource consumption report, determine if the consumer has reduced the resource consumption during the peak hours' time range from the first resource consumption report; in response to determining that the consumer did not reduce the resource consumption, set a condition that the first set of suggestions was not effective in changing consumption behavior of the consumer, and generate a second report of the series of resource consumption reports that includes a second set of suggestions selected from the set of available suggestions that is different than the first set of suggestions; transmit the second report to the location of the consumer and repeat determining whether the resource consumption of the consumer is reduced subsequent to the second report including the second set of suggestions; and wherein each time the processor determines that a previously selected suggestion does not cause a reduction in the resource consumption by the consumer, the processor is configured to select a different suggestion from the set of available suggestions for a subsequent report in subsequent time intervals continuously over at least a year-long time period to establish the series of coordinated resource consumption reports.

In a second aspect, a computer-implemented method is provided. The method comprises: receive resource consumption data for a consumer of a resource, wherein the resource consumption data includes information regarding a current billing amount that the consumer was charged for consumption of the resource, a peak hours rate and a peak hours' time range, and a non-peak hours rate and a non-peak hours' time range for consumption of the resource by the consumer over a time interval; generate a first resource consumption report of a series of coordinated resource consumption reports for transmission to the consumer, wherein the first resource consumption report (i) includes information related to a comparison of how much resource the consumer used during the peak hours' time range during a first time period and during a second time period, and (ii) includes a first set of suggestions for reducing resource usage during the peak hours' time range, wherein the processor is configured to select the first set of suggestions from an available set of suggestions stored in the memory, wherein each suggestion includes a different suggestion for reducing resource consumption; transmit the first resource consumption report to a location associated with the consumer; subsequent to the transmission of the first resource consumption report, determine if the consumer has reduced the resource consumption during the peak hours' time range from the first resource consumption report; in response to determining that the consumer did not reduce the resource consumption, set a condition that the first set of suggestions was not effective in changing consumption behavior of the consumer, and generate a second report of the series of resource consumption reports that includes a second set of suggestions selected from the set of available suggestions that is different than the first set of suggestions; transmit the second report to the location of the consumer and repeat determining whether the resource consumption of the consumer is reduced subsequent to the second report including the second set of suggestions; and wherein each time the processor determines that a previously selected suggestion does not cause a reduction in the resource consumption by the consumer, the processor is configured to select a different suggestion from the set of available suggestions for a subsequent report in subsequent time intervals continuously over at least a year-long time period to establish the series of coordinated resource consumption reports.

In a third aspect, a non-transitory computer-readable medium storing instructions is provided. The instructions, when executed by a computer processor, cause the computer processor to: receive resource consumption data for a consumer of a resource, wherein the resource consumption data includes information regarding a current billing amount that the consumer was charged for consumption of the resource, a peak hours rate and a peak hours' time range, and a non-peak hours rate and a non-peak hours' time range for consumption of the resource by the consumer over a time interval; generate a first resource consumption report of a series of coordinated resource consumption reports for transmission to the consumer, wherein the first resource consumption report (i) includes information related to a comparison of how much resource the consumer used during the peak hours' time range during a first time period and during a second time period, and (ii) includes a first set of suggestions for reducing resource usage during the peak hours' time range, wherein the processor is configured to select the first set of suggestions from an available set of suggestions stored in the memory, wherein each suggestion includes a different suggestion for reducing resource consumption; transmit the first resource consumption report to a location associated with the consumer; subsequent to the transmission of the first resource consumption report, determine if the consumer has reduced the resource consumption during the peak hours' time range from the first resource consumption report; in response to determining that the consumer did not reduce the resource consumption, set a condition that the first set of suggestions was not effective in changing consumption behavior of the consumer, and generate a second report of the series of resource consumption reports that includes a second set of suggestions selected from the set of available suggestions that is different than the first set of suggestions; transmit the second report to the location of the consumer and repeat determining whether the resource consumption of the consumer is reduced subsequent to the second report including the second set of suggestions; and wherein each time the processor determines that a previously selected suggestion does not cause a reduction in the resource consumption by the consumer, the processor is configured to select a different suggestion from the set of available suggestions for a subsequent report in subsequent time intervals continuously over at least a year-long time period to establish the series of coordinated resource consumption reports.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 1 illustrates an example configuration of devices and a network in accordance with various aspects of the technology.

FIG. 2 illustrates one embodiment of a sample introductory communication that is sent from a utility provider to a utility customer, according to the present system/method.

FIG. 3 illustrates one embodiment of a sample seasonal communication that is sent from a utility provider to a utility customer, according to the present system/method.

FIG. 4 illustrates one embodiment of a sample communication that is sent from a utility provider to a utility customer notifying the customer that the customer's utility pricing and peak hours will be changing, according to the present system/method.

FIG. 5 illustrates one embodiment of a sample communication that is sent from a utility provider to a utility customer notifying the customer that the customer's utility pricing and peak hours have changed, according to the present system/method.

FIG. 7 illustrates an embodiment of a high bill alert communication that is sent from a utility provider to a utility customer notifying the customer that the customer's utility bill could be unexpectedly high, according to the present system/method.

DETAILED DESCRIPTION

Figure 6:
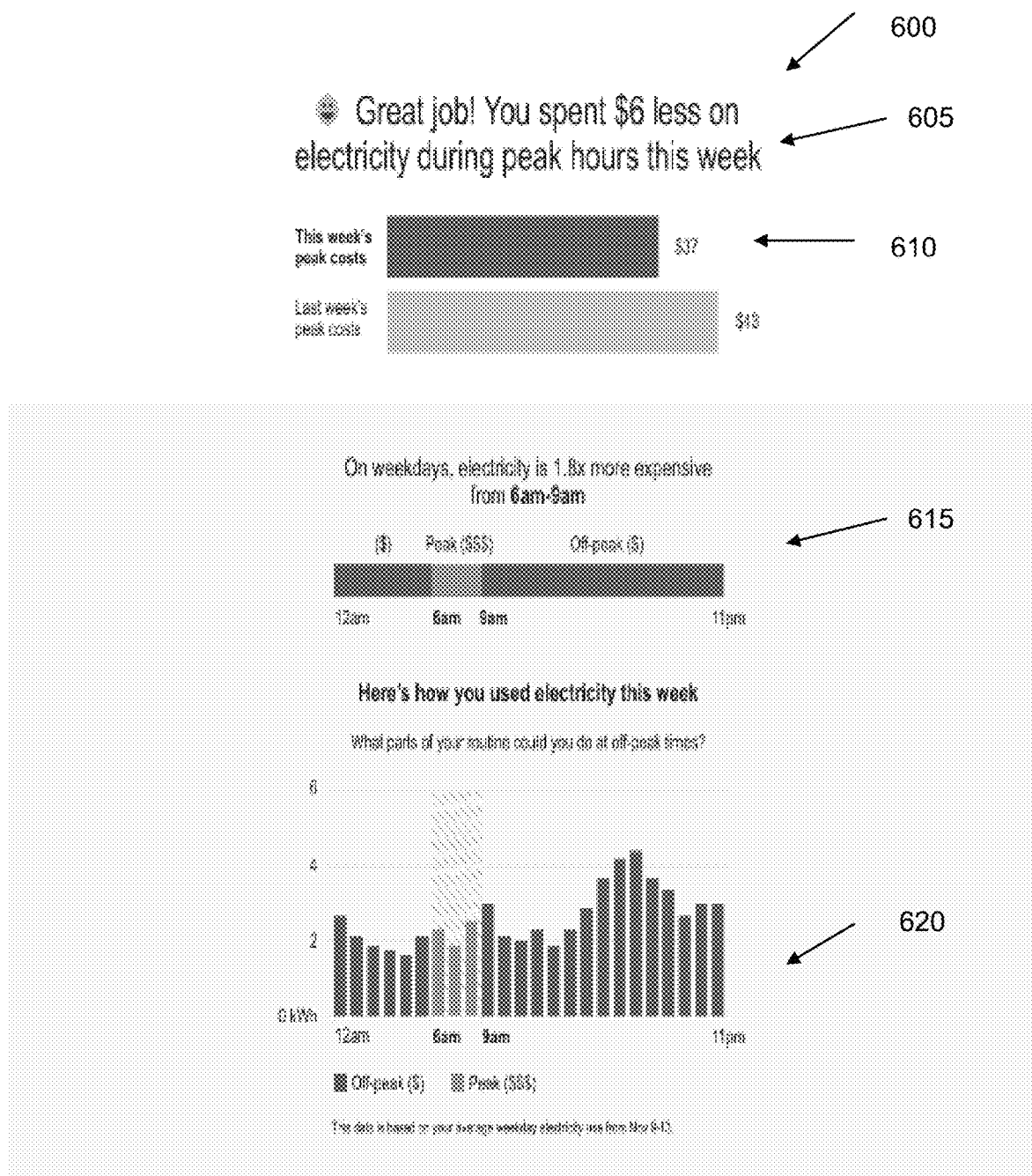
FIG. 6 illustrates another embodiment of a sample seasonal communication that is sent from a utility provider to a utility customer, according to the present system/method.

Computer implemented systems and methods are described herein that are directed to energy conservation and reducing resource consumption (e.g., usage of electricity) by targeting consumers to change usage behavior during certain time periods. Reducing consumption directly causes less power to be drawn from an electricity grid, which causes less power to be generated by an electrical power system of a community. If too much power is drawn and consumed at a particular time, an electrical overload may occur and cause a power outage (e.g., black out, brown out). An overload can also cause electrical equipment such as transformers or distributors to fail throughout an electrical grid. Failed equipment and/or a power outage creates serious and undesirable electrical issues. In one embodiment, the present system and method implements a technique for reducing resource consumption to improve the efficiency of the power system, thereby possibly reducing power outages and equipment failure, and saving energy.

In prior systems, utility providers such as electricity, water and sewer providers generate a bill for each customer, such as a monthly electric bill, that shows the total due for the electricity bill for that month. Also, the electricity bill may also provide, for example, a histogram of the electricity costs for that particular customer for the last twelve (12) billing cycles. In this manner, the customer can see what are the months in which the electric costs are the highest and which months the electric costs are the lowest. The electric bill may also include a cost comparison in the costs histogram that shows the difference between electric costs in a particular month and the electric costs for that same month in the previous year. This provides information to the utility customer that may be useful to the utility customer especially if the same month comparison shows a large disparity in the utility costs between the two (2) comparable months.

These types of utility bills provide the utility customer with some static information as to how much electricity the customer is using and paying for during a particular billing cycle. In some cases, a comparison is provided as to how much the customer paid for the utility between one billing cycle and another comparable billing cycle. However, these prior techniques are not effective to reduce consumption, are not dynamic, do not change behavior, do not learn from previous behavior patterns, and/or do not provide insights for a customer for how or when to change consumption patterns/behavior.

It would be an improvement to prior systems if the system could determine and generate insights for a particular customer as to how to further reduce his/her utility usage, which directly affects the power demand on the utility provider. For example, insights may be provided to the utility customer as to how to lower his/her electric consumption by raising/lowering the thermostat in the customer's residence especially during the peak hours when the customer is being charged the most for the utility consumption. Peak hours refer to the time of day when the resource provider such as an electricity provider charges the most to provide the electricity to the customer. For example, during the summer, the peak hours are typically between 4 pm and 9 pm when there is a great demand for electricity because air conditioners and other such high electricity using appliances are being operated by the customer and other customers of the utility provider. Thus, reducing demand should improve the overall electrical system by reducing the chance of overload, blackouts, and equipment failure.

According to one embodiment of the present system, a behavioral load shaping (BLS) campaign or program involves generating and sending a series of coordinated communications to utility customers (e.g., via electronic mail, regular mail, etc.) throughout a calendar year. To accomplish this, customer resource consumption reports detailing resource consumption by each customer can be generated and transmitted by the utility provider to utility customers to encourage the consumers to reduce their resource consumption. For example, an initial communication is sent to the utility customer to inform the utility customer of the program, but after the initial communication has been sent, other types of customer resource consumption reports may be sent at regular intervals (such as weekly, monthly, seasonally, etc.) via e-mails, text messages, automated calls, or any combination thereof based on at least previous feedback received. Thus, a series or sequence of coordinated communications are generated and transmitted where each communication is based on and/or builds off from the previous communication, while the system considers any feedback data received from the customer relating to changes in consumption. In one embodiment, the system intelligently selects communications with suggestions to reduce consumption for a particular target customer and then changes the suggestions in subsequent communications, for example, if consumption does not reduce in the next time period. When consumption does not reduce, this condition may indicate to the system that the previous suggestion was not effective to cause a consumption behavior change in the customer.

In particular, the computing system 100 (FIG. 1) may send the communications to the client devices 115 of the customers via the communications network 110 in the form of e-mails, text messages, etc. Each communication may inform the respective customer of the customer's resource consumption (such as electrical consumption) during a particular time period, inform the customer of peak hours during that particular time period when the cost of the resource consumption (electrical usage) is the greatest and provide insights to the customer that will allow the customer to reduce resource consumption during that time period, especially during the peak hours. For example, the communication may identify the day and time period (e.g., 4 pm-9 pm) of the peak hours in which the customer is being charged the most for the resource consumption and include recommendations (insights) for reducing the resource consumption (electrical usage) during the peak hours such as setting a thermostat a few degrees higher, shifting use of large appliances (e.g., dishwasher) to non-peak hours, etc. If utility rates will be higher during the peak hours, then the communication may also inform the customer of the higher rates to encourage the customer to reduce resource consumption during the peak hours.

At the end of the time interval, such a weekly interval, the computing system 100 may send each customer a subsequent communication providing the customer with feedback on how much energy he/she saved during the previous time interval (last week) and especially, during the peak hours. For example, the computing system 100 may send the subsequent communication to the client device 115 of the customer via the communications network 110 in the form of an e-mail, a text message, etc. For example, the subsequent communication may indicate the amount of the resource (e.g., electricity) that the customer saved during the previous time interval.

It is to be understood that the insights that are sent to the customer are provided to the customer in order to inform the customer and encourage greater efficiency by the customer in using the utility in the future.

It should be noted that some large electrical grids in large metropolitan cities can have hundreds of thousands or millions of customers drawing power from the grid. Thus, even a small percentage of customers who reduce consumption by a small degree can have large effects on the entire grid system.

It should be understood that the present system and method is directed to reducing power demand and reducing power generation to save energy. Although some examples herein refer to a customer reducing their bill, the present technique is not directed to a financial process or motivated by financial reasons. From the system's perspective (the utility provider's perspective), a reduction in consumption translates to lower revenue for the utility provider, not increased revenue. Reducing a customer's bill may be one way to motivate the customer to reduce energy consumption and thus is used as an example.

With reference to FIG. 1, FIG. 1 illustrates one embodiment of an exemplary system configuration 100, wherein electronic devices communicate via a network for purposes of exchanging content and other data. As illustrated, multiple computing devices (client devices 115, resource monitoring devices 120 and resource management system 105) can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communications links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 1100 of FIG. 11.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

Resource management system 105 can be configured to generate customer resource consumption reports and transmit the customer resource consumption reports to consumers to encourage resource reductions. It is to be understood that a resource can be any type of consumable resource. For example, a resource can be a natural resource such as water, gas, oil, electricity, coal, etc. Alternatively, a resource can be a digital resource such as bandwidth, data storage, computing power, etc. Further, a resource can be raw materials, labor, finished goods, machinery, recyclables, etc.

A consumer/user can be any person, group of people, building or premises, entity, etc., that consumes resources. For example, a consumer can be an individual, a family, a household, business, etc.

A customer resource consumption report can be any type of report or message that details or describes resource consumption by the customer such as a utility customer. For example, a customer resource consumption report can be a report detailing past resource consumption of individual consumers. Alternatively, or additionally, a customer resource consumption report can detail expected future resource consumption of an individual consumer. For example, a customer resource consumption report can identify predicted peak resource consumption events or "peak hours," during which an increase in the cost of providing the resource to the customer is expected.

In addition to describing resource consumption, a customer resource consumption report can also include a message (with insights and/or suggestions) encouraging a consumer to reduce their resource consumption. For example, a customer resource consumption report that includes details of peak hours can also include a message (insights) encouraging a consumer to reduce their resource consumption during the expected peak hours. Targeting customers and reducing their consumption directly causes less power to be drawn from an electricity grid. This, in turn, causes less power to be generated by an electrical power system of a community. If too much power is drawn and consumed at a particular time (e.g., peak hours), an electrical overload may occur and cause a power outage (e.g., black out, brown out). An overload can also cause electrical equipment such as transformers or distributors to fail throughout an electrical grid. Failed equipment and/or a power outage creates serious and undesirable electrical issues, which can be avoided if appropriate consumption is reduced. Furthermore, the customer resource consumption report can include details of monetary savings associated with reducing resource consumption during a defined time frame, such as during the predicted peak hours. This may also be an incentive to reduce consumption during the peak hours.

Resource management system 105 can be configured to receive customer resource consumption data from one or more resource monitoring devices 120 in network communication with resource management system 105. Customer resource consumption data can be any information describing resource consumption by one or more consumers. For example, resource consumption data can describe an amount of resources consumed, a rate of resource consumption over a predefined time period, a type of resources consumed, information related to one or more consumer/s that consumed the resources, times in which the resource/s were consumed, geographic location/s at which the resources were consumed, etc.

A resource monitoring device 120 can be any type of device that can monitor customer resource consumption and/or receive customer resource consumption data. For example, a resource monitoring device 120 can be a utility monitoring device, such as a gas/electricity meter attached to a building to monitor the gas and electricity consumed at a building's location. Alternatively, a customer resource monitoring device 120 can be a computing device in which customer resource consumption data is entered or received from metering devices. For example, resource monitoring device 120 can be a utility company server that gathers or receives resource consumption data from a plurality of consumers.

Resource management system 105 can include data storage 130 configured to store customer resource consumption data and customer resource management system 105 can be configured to store the received consumption data in data storage 130. Data storage 130 can also store consumer profile data for multiple consumers. This can include each consumer's name, address, contact info, location, types of resources consumed, types and numbers of appliances associated with the consumer, etc. The consumer profile data stored in data storage 130 can be associated with the customer resource consumption data for the specified consumer.

Resource management system 105 can also include report generation module 125 that is configured to generate customer resource consumption reports that can be transmitted to consumers to encourage the consumers to reduce their resource consumption. Report generation module 125 can be configured to communicate with data storage 130 and/or one or more resource monitoring devices 120 to retrieve customer resource consumption data and generate the customer resource consumption reports. Report generation module 125 can then be used to transmit the generated customer resource consumption reports to the appropriate consumers.

Report generation module 125 can be used to transmit the generated customer resource consumption reports in a variety of ways. For example, in some embodiments, report generation module 125 can be used to transmit the customer resource consumption reports as text or an instant message that is received on the consumer's client device 115. Alternatively, report generation module 125 can be used to transmit the customer resource consumption reports in an e-mail to the appropriate consumers. Further, report generation module 125 can be used to transmit the generated customer resource consumption report as a short message service (SMS), interactive voice response (IVR), traditional mail, etc. Report generation module 125 can communicate with data storage 130 to gather contact information for the consumers which can then be used to transmit the resource consumption reports.

According to some aspects, the generated customer resource consumption reports may be provided to consumers via a website hosted by resource management system 105. For example, a consumer may login to a secure website and view their corresponding customer resource consumption report. In some implementations, a link to the website may be transmitted to the consumer via any of the variety of ways discussed above.

In some embodiments, report generation module 125 can be used to transmit the customer resource consumption reports to consumers via one or more preferred communication channels selected by the consumer. For example, resource management system 105 can be configured to provide a customer resource consumption interface that enables consumers to select one or more preferred communication channels through which the consumer would like to receive their customer resource consumption reports. Consumers can use one of the client devices 115 to communicate with resource management system 105 to access the customer resource consumption interface and select their preferred communication channel. Content management system 105 can store the preferred communication channel in data storage 130 and associate the stored data with the corresponding consumer. Report generation module 125 can communicate with data storage 130 to gather the preferred communication channel selected by a consumer, which can then be used to determine the communication channel with which to transmit the customer resource consumption report to the consumer.

In some embodiments, report generation module 125 can be configured to generate and transmit customer resource consumption reports to consumers at predetermined times or according to a predetermined schedule. For example, report generation module 125 can be configured to generate and transmit customer resource consumption reports once a day, week, month, season, etc.

In some embodiments, report generation module 125 can be configured to generate and transmit customer resource consumption reports to consumers in response to the detection of a particular event. For example, the report generation module 125 may determine when an expected change in peak hours is scheduled, generate customer a resource consumption report for a consumer in response to the detection of the expected change in peak hours, and transmit the customer resource consumption report to the customer prior to the expected change in peak hours. This can include known recurring changes in peak hours, for example, based on historical data, as well as determined and/or predicted changes in peak hours. For example, report generation module 125 can have access to a schedule of recurring changes in peak hours and be configured to generate and transmit customer resource consumption reports prior to the recurring changes in peak hours.

Alternatively, report generation module 125 can be configured to receive data describing an upcoming change in peak hours. For example, an administrator of resource management system 105 can login and enter details of an upcoming change in peak hours. Alternatively, resource management system 105 can receive details of an upcoming change in peak hours from a resource provider, such as a utility company. The resource provider can transmit data detailing the change in peak hours to resource management system 105 or, alternatively, resource management system 105 can periodically query the resource provider regarding whether a change in peak hours is upcoming. Report generation module 125 can be configured to generate and transmit customer resource consumption reports prior to the upcoming change in peak hours.

In certain implementations, resource management system 105 can be configured to predict upcoming changes in peak hours. Resource management system 105 can include peak hour module 135 configured to analyze data to predict upcoming changes in peak hours. For example, peak hour module 135 can be configured to communicate with data storage 130 or resource monitoring devices 120 (e.g., utility servers) to access customer resource consumption data. The peak hour module 135 can analyze the retrieved data to predict upcoming changes in peak hours. For example, peak hour module 135 can analyze the customer resource consumption data to identify trends of factors that indicate that a change in peak hours is upcoming. This can include analyzing a change in peak hours for a specified resource type, geographic region, consumer group, etc.

In some implementations, peak hour module 135 can be configured to receive and analyze non-consumption data to predict an upcoming change in peak hours. Non-consumption data can be any type of data that is not resource consumption data. For example, peak hour module 135 can analyze environmental data, such as the weather forecast (e.g., weather forecast data), to predict customer resource consumption. Hot weather and/or cold weather can indicate an increase in the customer consumption of certain resources, such as water, electricity and/or gas. As such, peak hour module 135 can use information relating to weather conditions as a factor in predicting an upcoming change in peak hours. For example, peak hour module 135 can determine that a change in peak hours is likely on a specified time based upon a specified threshold value.

In some embodiments, the threshold value can be based on historical customer resource consumption data and weather data. For example, peak hour module 135 can be configured to analyze historical customer resource consumption data and historical weather data to identify when previous changes in peak hours occurred.

Furthermore, resource management system 105 can receive non-consumption data from one or more $3^{rd}$ party servers (not shown) in network connection with resource management system 105. For example, a $3^{rd}$ party server can provide environmental data, such as the historical weather data, current weather data, and predicted weather forecast, to resource management system 105.

Peak hour module 135 can be configured to transmit a notification to report generation module 125 upon predicting an upcoming change in peak hours. The notification can include data describing the predicted change in peak hours, including the predicted dates of the change in peak hours, resources consumed, etc. In response, report generation module 125 can generate a customer resource consumption report including details of the predicted change in peak hours as well as a message encouraging consumers to reduce their resource consumption during the new peak hours. Report generation module 125 can transmit the generated customer resource consumption report to the consumers prior to the predicted change in peak hours.

To encourage consumers to reduce resource consumption, the customer resource consumption reports generated for a consumer can include details (insights) regarding monetary savings that can be earned by reducing resource consumption by the customer. For example, a customer resource consumption report can include an anticipated monetary cost for a consumer if the consumer does not reduce their resource consumption during the peak hours, as well as an anticipated monetary cost if the consumer does reduce their resource consumption during the peak hours. Report generation module 125 can calculate the anticipated monetary cost based on the consumer's past resource consumption data during peak hours, as well as other hours (non-peak hours) during the specified time periods. The consumer can then easily view the money that would be saved by reducing resource consumption, especially during the peak hours.

In some embodiments, the consumers can be provided with insights as to how to reduce their resource consumption, especially during peak hours. For example, resource management system 105 can provide a particular customer with information on lowering the thermostat in the customer's residence during the colder months and raising the thermostat during warmer months.

To accomplish this, resource management system 105 can include customer insights module 140 configured to provide helpful tips and suggestions (insights) to the customer to assist the customer in reducing his/her resource consumption. Customer insights module 140 can be configured to communicate with data storage 130 and/or other information sources to access resource consumption data for the consumers and generate insights for the consumers from the customer resource consumption data. Customer insights module 140 can store the generated customer insights data in data storage 130 where it can be associated with the corresponding consumer. Report generation module 125 can access the customer insights data for a consumer from data storage 130 and generate a customer resource consumption report for a consumer based on the consumer's insights data.

In some embodiments, customer insights module 140 can be configured to determine that a group of consumers are similar and provide insights to the consumers in the group. Customer insights module 140 can determine that a group of consumers are similar based on multiple factors. One possible factor can be geographic location of the consumer. Consumers can be determined to be more similar if they are located in close geographic proximity and less similar if they are located farther from each other geographically. Another factor can be the location type of the consumers. For example, consumers from a similar type of location, such as from suburban, rural or urban areas, can be considered to be similar even if they are geographically disparate, whereas consumers from a different type of location can be determined to be less similar, even if they are geographically proximate.

Another factor in determining that a group of consumers is similar can be the size of the individual consumers. Consumers, such as families, can be compared based on the size of the family (i.e., number of members of the family living together). Likewise, consumers such as a company can be compared based on the size of the company (i.e., number of employees). Consumers can be determined to be more similar if they are of similar size, and less similar if they are of differing sizes.

Consumer size can also include the size of a building or dwelling size/dwelling type associated with the consumer. For example, consumers such as families can be considered similar if they occupy similarly sized homes (e.g., similar dwelling size). Similarly, consumers may be considered to be similar if they all live in the same type of residence (e.g., single family homes, apartments, high-rise condominiums, etc., (e.g., similar dwelling type). Likewise, consumers such as companies can be considered similar if they have similar size office space.

In some embodiments, a group of consumers can be determined to be similar based on their historical customer resource consumption. For example, consumers that consume a similar amount of resources on average for a given time period can be determined to be more similar.

In some aspects, report generation module 125 can be configured to generate a resource consumption report for a consumer that will best encourage the consumer and/or not discourage the consumer from continuing to reduce resource consumption by the customer. For example, report generation module 125 can be configured to select the resource consumption data to include in the resource consumption report for a consumer based on how well the consumer reduced his/her resource consumption, especially during peak hours.

To encourage a consumer to continue to reduce their resource consumption, the consumer can be presented with data that highlights the consumer's achievements. For example, if a consumer reduces his/her resource consumption amongst a group of similar consumers to which the consumer has been compared, report generation module 125 can be configured to select to include and/or highlight the consumer's comparison amongst the group of similar consumers.

Likewise, to avoid discouraging a consumer from continuing to reduce resource consumption, the consumer can be presented with data that marginalizes the consumer's poor reduction in resource consumption in relation to other consumers. For example, if a consumer compares poorly amongst a group of similar consumers, report generation module 125 can be configured to omit the comparison data indicating the consumer's poor performance in the resource consumption report. Report generation module 125 can also replace the comparison data with alternate comparison data that may not reflect that the consumer performed as poorly. For example, a consumer that compared poorly amongst a group of similar consumers may have compared better when compared to the pool of consumers as a whole. In this situation, report generation module 125 can select to present the consumer's comparison data in relation to the consumers as a whole rather than the consumer's comparison data in relation to the group of similar consumers.

In some embodiments, report generation module 125 may include the most favorable comparison data in a customer resource consumption report for a consumer. For example, a consumer can be compared based on multiple metrics, such as resource consumption, improvement (e.g., improvement in the level of consumption reduction), etc., and report generation module 125 can select to include the comparison data that reflects the consumer's best comparison. Thus, if a consumer was not rated in a top predetermined percentage group, such as the top 25%, based on resources consumed, but the consumer was rated in the top 25% as measured by improvement over a previous time period, report generation module 125 can select to present the comparison data for improvement in the consumer's resource consumption report, thereby highlighting the consumer's accomplishments and further encouraging the consumer to continue reducing resource consumption.

FIG. 2 illustrates an example introductory resource consumption report 200 that can be transmitted from a utility provider to a utility customer prior to a BLS campaign being initiated for that particular utility customer. As shown, resource consumption report 200 can include message 205 welcoming the customer to the BLS resource consumption program. The message 205 can also include a notification 210 to the customer informing the customer that the customer is currently in a particular seasonal rate plan (such as a summer rate plan) and provide an encouragement to the customer to reduce resource consumption in order to reduce the customer's utility bill. In this manner, the message 205 and the notification 210 can further encourage the consumer to reduce resource consumption.

Resource consumption report 200 can also include resource peak hour data 215 that describes when are the peak hours for resource costs to the customer and a comparison of how much the costs of the resource to the customer are during the peak hours in relation to the other hours (non-peak hours) in the day. For example, as shown in FIG. 2, during the summer, the peak hours for the particular customer are between 4 pm and 9 pm. The resource peak hour data 215 provides information as the what are the peak hours and what hours are non-peak hours (non-peak hours). The resource peak hour data 215 then provides a comparison as to the cost of the resource to the customer during the peak hours and the non-peak hours so that the customer should be motivated to reduce his/her resource consumption during the peak hours in order to reduce his/her utility costs.

Resource consumption report 200 can also include resource consumption data 220 that describes the resource consumption by the consumer. As shown, resource consumption data 220 describes resource consumption by a customer over a period of time such as a day, week, month, year, etc. Further, resource consumption data 220 shows the amount of resources used by the customer during a particular time interval. For example, as shown in FIG. 2, resource consumption data 220 describes the amount of resource consumption by the customer during a particular week wherein the resource consumption during particular hours in that week are compared. As shown in FIG. 2, the customer had a fairly high resource consumption during the peak hours of 4 pm-9 pm. Consequently, resource consumption data 220 should provide an incentive to the customer to reduce his/her resource consumption during the peak hours in order to reduce his/her utility costs. Providing this type of resource consumption data 220 that reflects the impact of the BLS campaign can further encourage consumers to participate in the future and reduce resource consumption.

Resource consumption report 200 can also include resource consumption suggestion or hints data 230 that provides insights as to how the customer can reduce his/her resource consumption, especially during peak hours. As shown in FIG. 2, consumption suggestion or hints data 230 describes the impact of using certain appliances during peak hours. Further, the consumption suggestion or hints data 230 discusses using the appliances during non-peak hours in order to reduce the customer's utility costs. It is to be understood that the insights provided in resource consumption suggestion or hints data 530 should include new insights that have not been previously sent to the customer or, at least, have not been sent to the customer in the last resource consumption report 200.

Accordingly, the system may be used to identify the last suggestion data that was used in the previous communication(s) to the customer and the system selects a different suggestion or hint data from a set of available suggestions stored in a data structure. If, for example, the system determines that the previous suggestion was not effective to cause a reduction in energy consumption and behavior changes, the system may then attempt sending a different suggestion in the next communication. Thus, the system generates a coordinated series of communications as part of the BLS campaign to determine which suggestions may be effective to customers and cause a reduction in energy usage.

FIG. 3 illustrates an example seasonal resource consumption report 300 that can be transmitted from a utility provider to a utility customer during a BLS campaign after the customer has joined the BLS campaign. As shown in FIG. 3, resource consumption report 300 can include message 305 informing the customer as to the amount the customer saved on his/her utility costs during the previous time period such as the previous week. It is to be understood that seasonal resource consumption report 300 should be sent to the customer on regular intervals such as weekly or monthly with the preferred interval being weekly. Furthermore, seasonal resource consumption report 300 should be sent to the customer during a particular season. Once that season has ended, a different type of version of the seasonal resource consumption report is generated and sent to the customer, as will be discussed in greater detail later. As shown in FIG. 3, the message 305 congratulates the customer on saving on his/her utility costs especially during peak hours based on determining that less electricity was consumed from the previous time periods. In this manner, the message 305 can further encourage the consumer to reduce resource consumption especially during peak hours.

Seasonal resource consumption report 300 can also provide a graphical illustration 310 such as a bar graph that compares how much of the resource the customer consumed during a time period as compared to a previous time period. For example, the graphical illustration 310 can include a comparison of how much the customer spent on electrical consumption during peak hours during a previous week and how much the customer spent on electrical consumption during peak hours during the current week. In this manner, graphical illustration 310 can also further encourage the consumer to reduce resource consumption.

Resource consumption report 300 can also include resource peak hour data 315 that describes when are the peak hours for resource costs to the customer during that particular season and a comparison of how much the costs of the resource to the customer are during the peak hours of that season in relation to the other hours (non-peak hours) in the day. For example, as shown in FIG. 3, during the summer, the peak hours for the particular customer are between 4 pm and 9 pm. The resource peak hour data 315 provides information as the what are the peak hours and what hours are non-peak hours for that particular season. The resource peak hour data 315 then provides a comparison as to the cost of the resource to the customer during the peak hours and the non-peak hours of that season so that the customer should be motivated to reduce his/her resource consumption during the peak hours of that season in order to reduce his/her utility costs during that season.

Resource consumption report 300 can also include resource consumption data 320 that describes the resource consumption by the consumer during that season. As shown in FIG. 3, resource consumption data 320 describes resource consumption by a customer during a season over a period of time such as a day, week, month, year, etc. Further, resource consumption data 320 shows the amount of resources used by the customer during a particular time interval. For example, as shown in FIG. 3, resource consumption data 320 describes the amount of resource consumption by the customer during a particular week wherein the resource consumption during particular hours in that week are compared. As shown in FIG. 3, the customer had a fairly high resource consumption during the peak hours of 4 pm-9 pm. Consequently, resource consumption data 320 should provide an incentive to the customer to reduce his/her resource consumption during the peak hours of that season in order to reduce his/her utility costs. Providing this type of resource consumption data 320 that reflects the impact of the BLS campaign can further encourage consumers to participate in the future and reduce resource consumption.

Resource consumption report 300 can also include resource consumption suggestion or hints data 330 that provides insights as to how the customer can reduce his/her resource consumption, especially during the peak hours of that season. As shown in FIG. 3, consumption suggestion or hints data 330 describes the impact of using certain appliances during peak hours of that particular season. Further, the consumption suggestion or hints data 330 discusses using the appliances during non-peak hours in order to reduce the customer's utility costs. It is to be understood that the insights provided in resource consumption suggestion or hints data 330 should include new insights that have not been previously sent to the customer or, at least, have not been sent to the customer in the last resource consumption reports 200 or 300.

It is to be understood that the insight or insights that are created by customer insights module 140 and included in the resource consumption suggestion or hints data 330 are targeted towards that particular customer. Based upon the information that the resource management system 105 obtains from the client devices 115, the resource monitoring devices 120, customer insights module 140, and the customer, the resource management system 105 determines what type of insight is to be sent to the customer in the resource consumption suggestion or hints data 330. For example, previous insights that have been sent to the customer will be stored in the data storage 130 so that subsequent insights will not continue to include the same insights as previously sent to the customer. Also, if it is determined, for example, that the customer does not own a dishwasher, the resource consumption suggestion or hints data 330 will not include insights regarding how the customer can reduce his/her resource consumption by not using the dishwasher during peak hours.

It is to be understood that the customer insights module 140 can be used to provide insights to a particular customer based upon the fact that the customer belongs to a similar group of customers. In this instance, customer insights module 140 can determine that a group of consumers are similarly based on multiple factors. One possible factor can be geographic location of the consumer. Another factor can be the location type of the consumers. For example, consumers from a similar type of location, such as from suburban, rural or urban areas, can be considered to be similar even if they are geographically disparate, whereas consumers from a different type of location can be determined to be less similar, even if they are geographically proximate. In this manner, customer insights module 140 can provide insights to this group of customers that are similar in nature.

Another factor in determining that a group of consumers is similar can be the size of the individual consumers. Consumers, such as families, can be compared based on the size of the family (i.e., number of members of the family living together). Likewise, consumers such as a company can be compared based on the size of the company (i.e., number of employees). Consumers can be determined to be more similar if they are of similar size, and less similar if they are of differing sizes. Again, customer insights module 140 can provide insights to this group of customers that are similar in nature.

Consumer size can also include the size of a building or dwelling size/dwelling type associated with the consumer. For example, consumers such as families can be considered similar if they occupy similarly sized homes (e.g., similar dwelling size). Similarly, consumers may be considered to be similar if they all live in the same type of residence (e.g., single family homes, apartments, high-rise condominiums, etc., (e.g., similar dwelling type). Likewise, consumers such as companies can be considered similar if they have similar size office space. Here too, customer insights module 140 can provide insights to this group of customers that are similar in nature.

In some embodiments, a group of consumers can be determined to be similar based on their historical customer resource consumption. For example, consumers that consume a similar amount of resources on average for a given time period can be determined to be more similar. In this manner, customer insights module 140 can provide insights to this group of customers that are similar in nature.

FIG. 4 illustrates an example resource consumption report 400 that can be transmitted from a utility provider to a utility customer during a BLS campaign notifying the customer that peak hours for that particular customer will be changing soon. As shown, resource consumption report 400 can include message 405 informing the customer that the peak hours for that particular customer will be changing and the price associated with the change in peak hours. It is to be understood that resource consumption report 400 should be sent to the customer in order to provide the customer with enough advance notice regarding the change in peak hours and peak hour pricing so that the customer will have sufficient time in order to properly act upon the resource consumption report 400. In particular, if the peak hour module 135 determines that the peak hours for a particular customer are going to change in thirty (30) days, the resource consumption report 400 should be sent to the customer so that the customer can put into place certain measures so that the customer can adjust his/her resource consumption during the new peak hours. For example, if the peak hours are going to change from 4 pm to 9 pm to 6 am to 9 am, then the customer can adjust his/her resource consumption so that fewer appliances will be used during the 6 am to 9 am time period. In this manner, the message 405 can further encourage the consumer to reduce resource consumption.

Resource consumption report 400 can also provide a graphical illustration 410 that compares the dates of the current peak hours to when the new peak hours will start, a comparison of the current peak hours and the new peak hours, and a comparison of how much the current peak hours cost in terms of a utility bill and how much the new peak hours will cost in terms of the utility bill. For example, the graphical illustration 410 shows that the current peak hours run from October to May and the new peak hours will run from June to September. Also, the current peak hours are from 6 am to 9 am and the new peak hours are from 4 pm to 9 pm. Finally, the price difference between the current peak hours and non-peak hours and the new peak hours and non-peak hours can be shown. In this manner, graphical illustration 410 can also further encourage the consumer to reduce resource consumption.

Resource consumption report 400 can also provide a graphical illustration 412 such as a line graph that compares how much of the resource the customer consumed during a time period as compared to a previous time period. For example, the graphical illustration 412 can be a comparison of how much the customer spent on electrical consumption during peak hours during a previous month and during which week did the customer spend the least on his/her utility costs. In this manner, graphical illustration 412 can also further encourage the consumer to reduce resource consumption.

Resource consumption report 400 can also include resource peak hour data 415 that describes when are the peak hours for resource costs to the customer during that particular time period and a comparison of how much the costs of the resource to the customer are during the peak hours of that time period in relation to the other hours (non-peak hours) in the day. For example, as shown in FIG. 4, during the winter, the peak hours for the particular customer are between 6 am and 9 am. The resource peak hour data 415 provides information as to what are the peak hours and what hours are non-peak hours for that particular time period. The resource peak hour data 415 then provides a comparison as to the cost of the resource to the customer during the peak hours and the non-peak hours of that time period so that the customer should be motivated to reduce his/her resource consumption during the peak hours of that time period.

Resource consumption report 400 can also include resource consumption data 420 that describes the resource consumption by the consumer during that time period. As shown, resource consumption data 420 describes resource consumption by a customer during period of time such as a day, week, month, year, etc. Further, resource consumption data 420 shows the amount of resources used during a particular time interval. For example, as shown in FIG. 4, resource consumption data 420 describes the amount of resource consumption during a particular week wherein the resource consumption during particular hours in that week is compared. As shown in FIG. 4, the customer had a fairly low resource consumption during the peak hours of 6 am to 9 am. Consequently, resource consumption data 420 should provide an incentive to the customer to reduce his/her resource consumption during the peak hours of that time period in order to reduce his/her utility costs. Providing this type of resource consumption data 420 that reflects the impact of the BLS campaign can further encourage consumers to participate in the future and reduce resource consumption.

Resource consumption report 400 can also include resource consumption suggestion or hints data 430 that provides insights as to how the customer can reduce his/her resource consumption, especially during peak hours. As shown in FIG. 4, consumption suggestion or hints data 430 describes the impact of using certain appliances during peak hours of that particular time period. Further, the consumption suggestion or hints data 430 discusses using the appliances during non-peak hours in order to reduce the customer's utility costs. It is to be understood that the insights provided in resource consumption suggestion or hints data 530 should include new insights that have not been previously sent to the customer or, at least, have not been sent to the customer in the last resource consumption reports 200, 300, or 400.

FIG. 5 illustrates an example resource consumption report 500 that can be transmitted from a utility provider to a utility customer during a BLS campaign notifying the customer that peak hours for that particular customer have changed. As shown in FIG. 5, resource consumption report 500 can include message 505 informing the customer that the peak hours for that particular customer have changed and the price associated with the change in peak hours. It is to be understood that resource consumption report 500 should be sent to the customer in order to provide the customer with enough notice regarding the change in peak hours and peak hour pricing so that the customer will have sufficient time in order to properly act upon the resource consumption report 500. For example, if the peak hours have changed from 6 am to 9 am to 4 pm to 9 pm, then the customer can adjust his/her resource consumption so that fewer appliances are being used during the 4 pm to 9 pm time period. In this manner, the message 505 can further encourage the consumer to reduce resource consumption.

Resource consumption report 500 can also provide a graphical illustration 510 that compares the dates of the current peak hours as to when the new peak hours will start, a comparison of the current peak hours and the new peak hours, and a comparison of how much the current peak hours cost in terms of a utility bill and how much the new peak hours will cost in terms of the utility bill. For example, the graphical illustration 510 shows that the current peak hours run from June to September and the old peak hours will run from October to May. Also, the current peak hours are from 4 pm to 9 pm and the old peak hours are from 6 am to 9 am. Finally, the price difference between the current peak hours and non-peak hours and the old peak hours and non-peak hours can be shown. In this manner, graphical illustration 510 can also further encourage the consumer to reduce resource consumption.

Resource consumption report 500 can also include resource peak hour data 515 that describes when are the peak hours for resource costs to the customer during that particular time period and a comparison of how much the costs of the resource to the customer are during the peak hours of that time period in relation to the other hours (non-peak hours) in the day. For example, as shown in FIG. 5, during the summer, the peak hours for the particular customer are between 4 pm and 9 pm. The resource peak hour data 515 provides information as to what are the peak hours and what hours are non-peak hours for that particular time period. The resource peak hour data 515 then provides a comparison as to the cost of the resource to the customer during the peak hours and the non-peak hours of that time period so that the customer should be motivated to reduce his/her resource consumption during the peak hours of that time period in order to reduce his/her utility costs during that time period.

Resource consumption report 500 can also include resource consumption suggestion or hints data 530 that provides insights as to how the customer can reduce his/her resource consumption, especially during peak hours. As shown in FIG. 5, consumption suggestion or hints data 530 describes the impact of using certain appliances during peak hours of that particular time period. Further, the consumption suggestion or hints data 530 discusses using the appliances during non-peak hours in order to reduce the customer's utility bill. It is to be understood that the insights provided in resource consumption suggestion or hints data 530 should include new insights that have not been previously sent to the customer or, at least, have not been sent to the customer in the last resource consumption reports 200, 300, 400 or 500.

FIG. 6 illustrates an example of another seasonal resource consumption report 600 that can be transmitted from a utility provider to a utility customer during a BLS campaign after the customer has joined the BLS campaign It is to be understood that seasonal resource consumption report 300 can be sent during the summer months, for example, and the seasonal resource consumption report 600 can be sent during the winter months. As shown, resource consumption report 600 can include message 605 informing the customer as to the amount the customer saved on his/her utility costs during the previous time period such as the previous week. It is to be understood that seasonal resource consumption report 600 should also be sent to the customer on regular intervals such as weekly or monthly with the preferred interval being weekly. Furthermore, seasonal resource consumption report 600 should be sent to the customer during a particular season, as discussed above. Once that season has ended, a different type of version of the seasonal resource consumption report will be sent to the customer. As shown in FIG. 6, the message 605 congratulates the customer on saving on his/her utility costs especially during peak hours. In this manner, the message 605 can further encourage the consumer to reduce resource consumption.

Seasonal resource consumption report 600 can also provide a graphical illustration 610 such as a bar graph that compares how much of the resource the customer consumed during a time period as compared to a previous time period. For example, the graphical illustration 610 can be a comparison of how much the customer spent on electrical consumption during peak hours during a previous week and how much the customer spent on electrical consumption during peak hours during the current week. In this manner, graphical illustration 610 can also further encourage the consumer to reduce resource consumption.

Resource consumption report 300 can also include resource peak hour data 615 that describes when are the peak hours for resource costs to the customer during that particular season and a comparison of how much the costs of the resource to the customer are during the peak hours of that season in relation to the other hours (non-peak hours) in the day. For example, as shown in FIG. 6, during the winter, the peak hours for the particular customer are between 6 am and 9 am. The resource peak hour data 615 provides information as to what are the peak hours and what hours are non-peak hours for that particular season. The resource peak hour data 615 then provides a comparison as to the cost of the resource to the customer during the peak hours and the non-peak hours of that season so that the customer should be motivated to reduce his/her resource consumption during the peak hours of that season in order to reduce his/her utility costs during that season.

Resource consumption report 600 can also include resource consumption data 620 that describes the resource consumption by the consumer during that season. As shown, resource consumption data 620 describes resource consumption by a customer during a season over a period of time such as a day, week, month, year, etc. Further, resource consumption data 620 shows the amount of resources used during a particular time interval. For example, as shown in FIG. 6, resource consumption data 620 describes the amount of resource consumption during a particular week wherein the resource consumption during particular hours in that week are compared. As shown in FIG. 6, the customer had a fairly low resource consumption during the peak hours of 6 am and 9 am. Consequently, resource consumption data 620 should provide an incentive to the customer to reduce his/her resource consumption during the peak hours of that season in order to reduce his/her utility costs. Providing this type of resource consumption data 620 that reflects the impact of the BLS campaign can further encourage consumers to participate in the future and reduce resource consumption.

Resource consumption report 600 can also include resource consumption suggestion or hints data 630 that provides insights as to how the customer can reduce his/her resource consumption, especially during peak hours. As shown in FIG. 6, consumption suggestion or hints data 630 describes the impact of using certain appliances during peak hours of that particular season. Further, the consumption suggestion or hints data 630 discusses using the appliances during non-peak hours in order to reduce the customer's utility bill. It is to be understood that the insights provided in resource consumption suggestion or hints data 630 should include new insights that have not been previously sent to the customer or, at least, have not been sent to the customer in the last resource consumption reports 200, 300, 400, 500 or 600.

FIG. 7 illustrates an example of a high bill alert/resource consumption report 700 that can be transmitted from a utility provider to a utility customer during a BLS campaign after the customer has joined the BLS campaign. It is to be understood that high bill alert/resource consumption report 700 is to be sent to the customer when the customer is about to exceed a threshold of resource consumption during a particular billing cycle. For example, if the customer is consuming resources at a high rate during a particular week, resource management system 105 will interact with report generation module 125 to transmit high bill alert/resource consumption report 700 to the customer.

It is to be understood that high bill alert/resource consumption report 700 will be sent to the customer anytime the customer has exceeded a threshold of resource consumption. For example, if resource management system 105 determines that a customer is about to exceed a threshold for electricity usage during a particular week, the resource management system 105 will then transmit the high bill alert/resource consumption report 700 to the customer. In this manner, the high bill alert/resource consumption report 700 can further encourage the consumer to reduce resource consumption.

As shown in FIG. 7, high bill alert/resource consumption report 700 can include message 705 informing the customer as to the amount the customer is projected to spend on electricity during the current billing cycle and an indication as to the amount this current bill will exceed what the customer paid for electricity during the same billing cycle last year. In this manner, the message 705 can further encourage the consumer to reduce resource consumption.

High bill alert/resource consumption report 700 can also provide a graphical illustration 710 that compares the resource consumption during peak hours and non-peak hours. For example, as shown in FIG. 7, the customer spent $105.00 during the non-peak hours of 12 am to 3 pm during the week, $71.00 during the peak hours of 3 pm to 8 pm during the week, and $44.00 during the non-peak hours of 8 pm to 12 am during the week. As shown in this example, the customer spent 32% of his/her electric costs during peak hours which is due in part to the fact that the customer is being charged 1.5 times the non-peak hour rate for the peak hour rate. In this manner, graphical illustration 710 can also further encourage the consumer to reduce resource consumption.

High bill alert/resource consumption report 700 can also include resource consumption suggestion or hints data 720 that provides insights as to why the customer may have exceeded his resource consumption threshold, especially during peak hours. As shown in FIG. 7, the weather during that particular billing cycle may been warmer than usual which may have caused the customer to use his air conditioning more than usual for this time of year. In this manner, resource consumption suggestion or hints data 720 can also further encourage the consumer to reduce resource consumption.

High bill alert/resource consumption report 700 can also include resource consumption suggestion or hints data 730 that provides insights as to how the customer can reduce his/her resource consumption, especially during peak hours. As shown in FIG. 7, consumption suggestion or hints data 730 describes the impact of raising the thermometer in the customer's residence as a way to lower the electricity usage by the customer and reduce the likelihood that the customer will receive a high bill alert/resource consumption report 700. It is to be understood that the insights provided in resource consumption suggestion or hints data 730 should include new insights that have not been previously sent to the customer or, at least, have not been sent to the customer in the last resource consumption reports 200, 300, 400, 500 or 600 or a previous high bill alert/resource consumption report 700.

Figure 8:
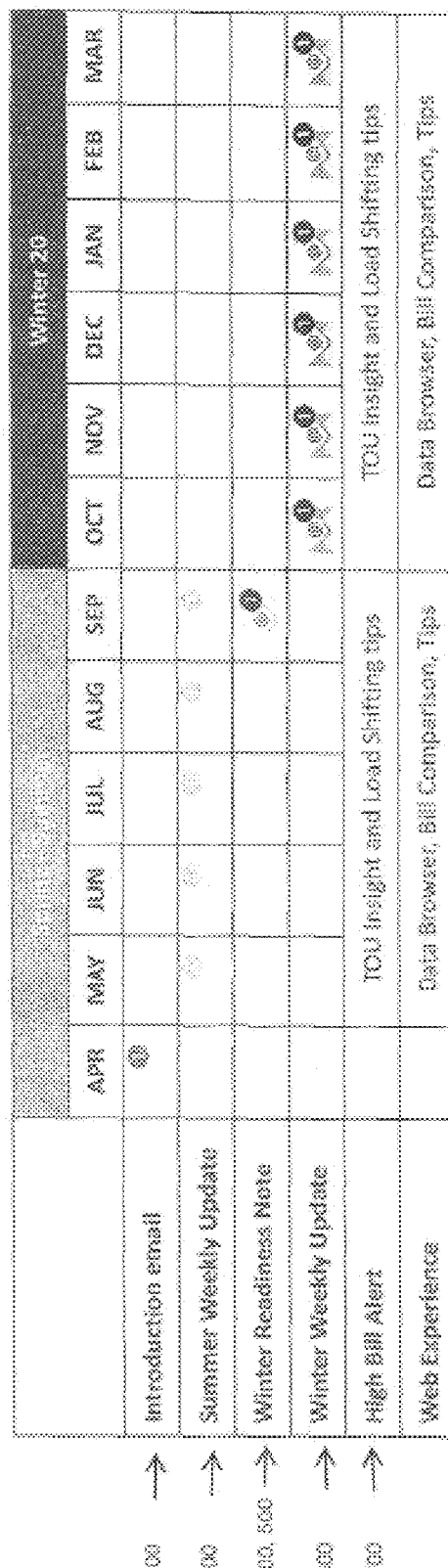
FIG. 8 illustrates an embodiment of a communication program for a particular utility customer, according to the present system/method.

FIG. 8 illustrates an example of a communication program protocol report 800 for a particular utility customer for use by a resource provider such as an electricity provider during a BLS campaign. In particular, communication program protocol report 800 can be used by a resource provider (such as an electricity provider) or a third party associated with the resource provider to set up a schedule of when the various resource consumption reports 300, 400, 500 or 600 or previous high bill alert/resource consumption report 700 are to be sent to the customer once the customer has joined the BLS program. For example, once the introductory resource consumption report 200 has been sent to the customer and the customer has been enrolled in the BLS program, the resource management system 105 can then begin sending the resource consumption reports 300, 400, 500 or 600 to the customer at regular intervals such as those intervals shown in FIG. 8.

In one embodiment, one improvement of the present system and method over previous techniques is the implementation and the use of communication program protocol report 800. In particular, as shown in FIG. 8, the customer receives the introductory resource consumption report 200, for example, in April. The resource management system 105 through interaction with report generation module 125 and peak hour module 135 can then transmit the first seasonal (summer) summer resource consumption reports 300 over a period of time, for example, weekly during the months of May to September (April if the customer is already enrolled in the BLS program). In September, the resource management system 105 through interaction with report generation module 125 and peak hour module 135 then interacts with the resource provider such as an electricity provider to determine if there is a change in peak hours and what is the cost differential in changing from one set of peak hours to a different set of peak hours.

The resource management system 105 then transmits the resource consumption reports 400 and 500 that inform the customer of the upcoming change in the peak hours and the price change as a result of the change in peak hours. The resource management system 105 through interaction with report generation module 125 and peak hour module 135 can then transmit the second seasonal (winter) resource consumption reports 600 over a period of time, for example, weekly during the months of October to March. It is to be understood that high bill alert/resource consumption report 700 can be transmitted by resource management system 105 to the customer anytime during the calendar year if the customer has exceeded a resource consumption, as discussed earlier. Finally, section 850 of the communication program protocol report 800 shows that the resource management system 105 interacts with the report generation module 125, data storage 130, and peak hour module 135 in order to create and then transmit the various resource consumption reports 200, 300, 400, 500, 600 and/or 700 to the customer including the bill comparisons and the insights.

Another improvement of the present system/method is that the communication program protocol report 800 is set up so that the resource management system 105 through interaction with report generation module 125 and peak hour module 135 can then transmit the resource consumption reports 300, 400, 500 or 600 to the customer at regular intervals throughout multiple months, over a year-long time period (e.g., a calendar year) and/or over successive calendar years. In this manner, communication program protocol report 800, in conjunction with resource consumption reports 300, 400, 500 or 600, can also further encourage the consumer to reduce resource consumption.

It is to be understood that resource management system 105 should transmit resource consumption reports 300, 400, 500 or 600 on a regular basis throughout a calendar year. For example, resource consumption reports 300 and 600 should be sent, at least, weekly so that the customer is encouraged to reduce resource consumption on a regular basis. However, other time intervals such as bi-weekly or monthly may also suffice as long the customer is reducing his/her resource consumption on a regular basis. Furthermore, resource consumption reports 400 and 500 should be transmitted to the customer at a time interval that allows the customer to adjust his/her resource consumption patterns to the new peak hours and the peak hour pricing. Finally, the high bill alert/resource consumption report 700 should be transmitted to the customer at a time interval that allows the customer to adjust his/her resource consumption and attempt to avoid a higher than normal utility bill.

Figure 9:
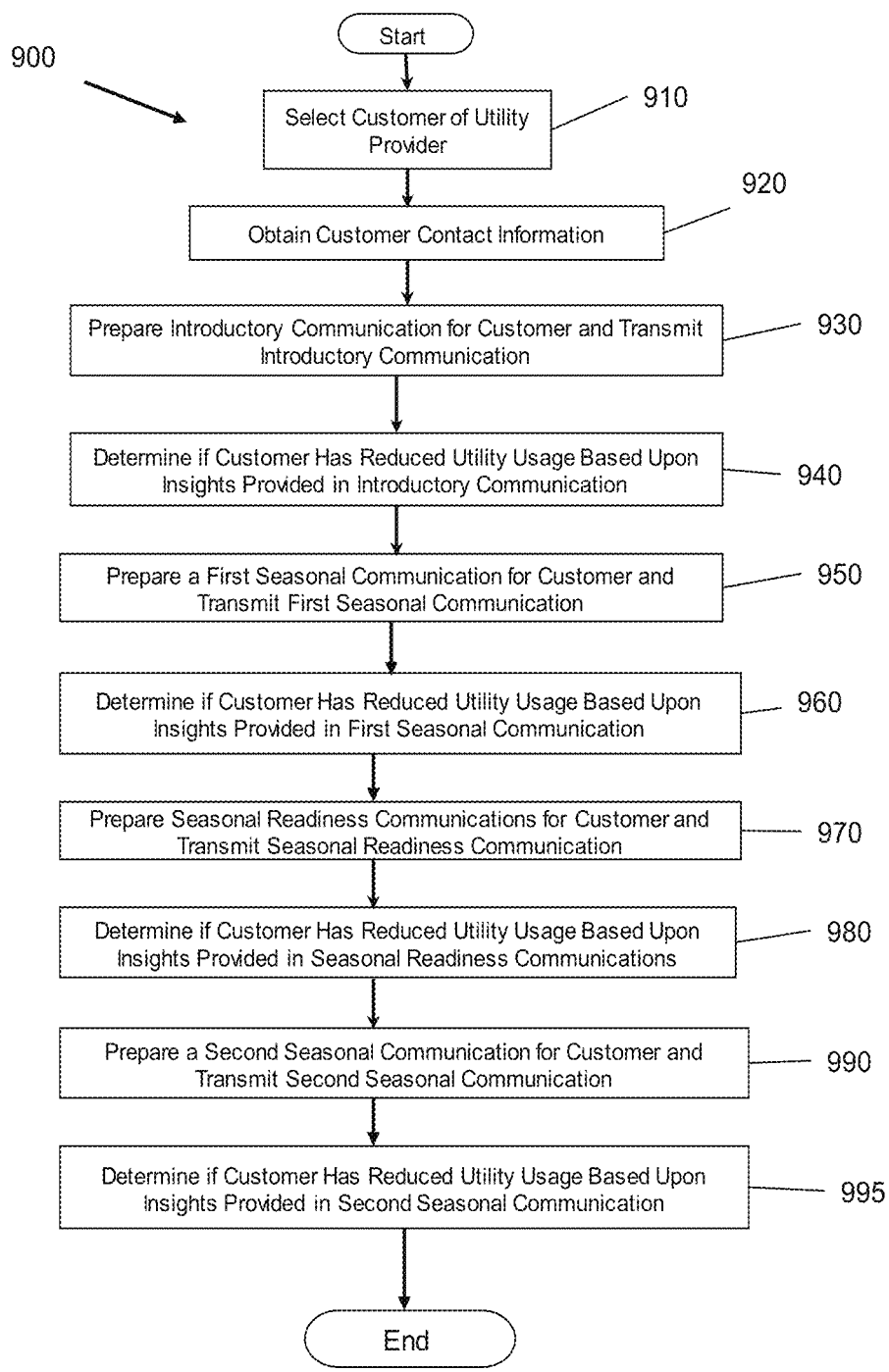
FIG. 9 illustrates a method for customer behavioral load shaping for adjusting customer resource consumption, according to the present system/method.

FIG. 9 illustrates an exemplary embodiment of implementing a BLS program to reduce resource consumption. As previously stated, reducing consumption by a customer directly causes less power to be drawn from an electricity grid, which causes less power to be generated by an electrical power system of a community. If too much power is drawn and consumed at a particular time (e.g., peak hours), an electrical overload may occur and cause a power outage (e.g., black out, brown out). An overload can also cause electrical equipment such as transformers or distributors to fail throughout an electrical grid. Failed equipment and/or a power outage creates serious and undesirable electrical issues. In general, a reduced demand on the electrical grid helps to maintain capacity levels on the grid and insures the health of the grid.

As shown in FIG. 9, the method begins at block 910 where a customer of a utility provider is selected, for example, from a set of customer data records that represent a plurality of customers. At step 920, the contact information and the resource consumption data of that customer is received by the resource management system 105. Resource consumption data can be data describing resource consumption by the customer. Further, resource consumption data can include data describing the resource consumption, such as the time the resources were consumed, identifying information pertaining to the customer that consumed the resource/s, etc.

At block 930, the introductory resource consumption report 400 is prepared and transmitted to the customer. As discussed earlier, the introductory resource consumption report 200 should contain information regarding the current resource consumption of the customer such as the electricity usage by that customer as obtained by the resource management system 105 from the resource provider such as an electricity provider. As discussed earlier, the resource consumption report 200 can be a message that includes (i) information related to a comparison of how much resource the consumer used during the peak hours' time range during a specified time period, (ii) includes a first set of suggestions for reducing resource usage during the peak hours' time range, and (iii) encourages consumers to reduce resource consumption. It is to be further understood that the first set of suggestions is selected from an available set of suggestions stored in the memory, wherein each suggestion includes a different suggestion for reducing resource consumption.

At block 940, the resource management system 105 then interacts with the resource provider to determine if the customer has reduced his/her resource consumption from one time interval to another time interval (daily, weekly, monthly, etc.) after the transmittal of the introductory resource consumption report 200. It is to be understood that if it is determined that the customer has not reduced his/her resource consumption, it is assumed that the first set of suggestions was not effective in terms of changing the resource consumption by the customer.

At block 950, resource management system 105 interacts with the report generation module 125, the peak hours module 135 and the customer insights module 140 to prepare and transmit the first seasonal resource consumption report 300 to the customer. As discussed earlier, the resource consumption report 300 can be a message that includes (i) information related to a comparison of how much resource the consumer used during the peak hours' time range during a specified time period, (ii) includes a second set of suggestions for reducing resource usage during the peak hours' time range, and (iii) encourages consumers to reduce resource consumption. It is to be further understood that the second set of suggestions is selected from an available set of suggestions stored in the memory, wherein each suggestion includes a different suggestion for reducing resource consumption and the second set of suggestions is selected from the set of available suggestions that is different than the first set of suggestions.

At block 960, the resource management system 105 then interacts with the resource provider to determine if the customer has reduced his/her resource consumption from one time interval to another after the transmittal of the first seasonal resource consumption report 300. It is to be understood that if it is determined that the customer has not reduced his/her resource consumption, it is assumed that the second set of suggestions was not effective in terms of changing the resource consumption by the customer.

Furthermore, the resource provider may also inform resource management system 105 that a change in the peak hours and the peak hour pricing will occur soon for that particular customer. However, it is to be understood that a change in peak hours can be predicted in numerous ways. For example, recurring changes in peak hours may be known from previous history. Alternatively, in some embodiments, a change in peak hours can be predicted based on analyzing resource consumption data and/or non-resource consumption data to identify patterns and/or factors that indicate that a change in peak hours is likely. This can include trends in resource consumption, weather forecast/s, and/or behavior models of individual/group user behavior, etc.

At block 970, resource management system 105 interacts with the report generation module 125, the peak hours module 135 and the customer insights module 140 to prepare and transmit the resource consumption reports 400 and 500 to the customer. The resource consumption reports 400 and 500 can be a message that includes (i) information related to a comparison of how much resource the consumer used during the peak hours' time range during a specified time period, (ii) includes a third set of suggestions for reducing resource usage during the peak hours' time range, and (iii) encourages consumers to reduce resource consumption. It is to be further understood that the third set of suggestions is selected from an available set of suggestions stored in the memory, wherein each suggestion includes a different suggestion for reducing resource consumption and the third set of suggestions is selected from the set of available suggestions that is different than the first and second set of suggestions. The generated resource consumption reports 400 and 500 can include details to notify the consumers about the change in peak hours and peak hour pricing and also a message requesting that the consumers reduce their resource consumption during the peak hours.

At block 980, the resource management system 105 then interacts with the resource provider to determine if the customer has reduced his/her resource consumption from one time interval after the transmittal of the resource consumption reports 400 and 500. It is to be understood that if it is determined that the customer has not reduced his/her resource consumption, it is assumed that the third set of suggestions was not effective in terms of changing the resource consumption by the customer.

At block 990, resource management system 105 interacts with the report generation module 125, the peak hours module 135 and the customer insights module 140 to prepare and transmit the second seasonal resource consumption report 600 to the customer. The resource consumption report 600 can be a message that includes (i) information related to a comparison of how much resource the consumer used during the peak hours' time range during a specified time period, (ii) includes a fourth set of suggestions for reducing resource usage during the peak hours' time range, and (iii) encourages consumers to reduce resource consumption. It is to be further understood that the fourth set of suggestions is selected from an available set of suggestions stored in the memory, wherein each suggestion includes a different suggestion for reducing resource consumption and the fourth set of suggestions is selected from the set of available suggestions that is different than the first, second, and third set of suggestions. ion.

At block 995, the resource management system 105 then interacts with the resource provider to determine if the customer has reduced his/her resource consumption from one time interval to after the transmittal of the second seasonal resource consumption report 600. It is to be understood that if it is determined that the customer has not reduced his/her resource consumption, it is assumed that the fourth set of suggestions was not effective in terms of changing the resource consumption by the customer.

It is to be understood that the resource consumption reports 200, 300, 400, 500, and 600 can also include resource consumption data detailing the resource consumption of the individual customer. This can include details regarding resource consumption as well reduction in resource consumption by the individual consumer. Finally, the resource consumption reports 200, 300, 400, 500, and 600 can also include suggestions (insights) on how the customer can reduce his/her resource consumption.

It is to be further understood that the generated resource consumption reports 200, 300, 400, 500, and 600 can be transmitted to the appropriate customers using one or more channels such as e-mail, text message, instant message, etc using assigned electronic addresses or device numbers associated with each customer. In some embodiments, a resource consumption report can be transmitted to a consumer using a preferred communication channel selected by the customer. In one embodiment, the reports can be generated in hardcopy form by a printing device and configured for transmission by physically delivery methods to an address associated with each customer. In some embodiments, both electronic and physical reports may be transmitted to a customer to further encourage reduction of resource consumption and saving energy.

Figure 10:
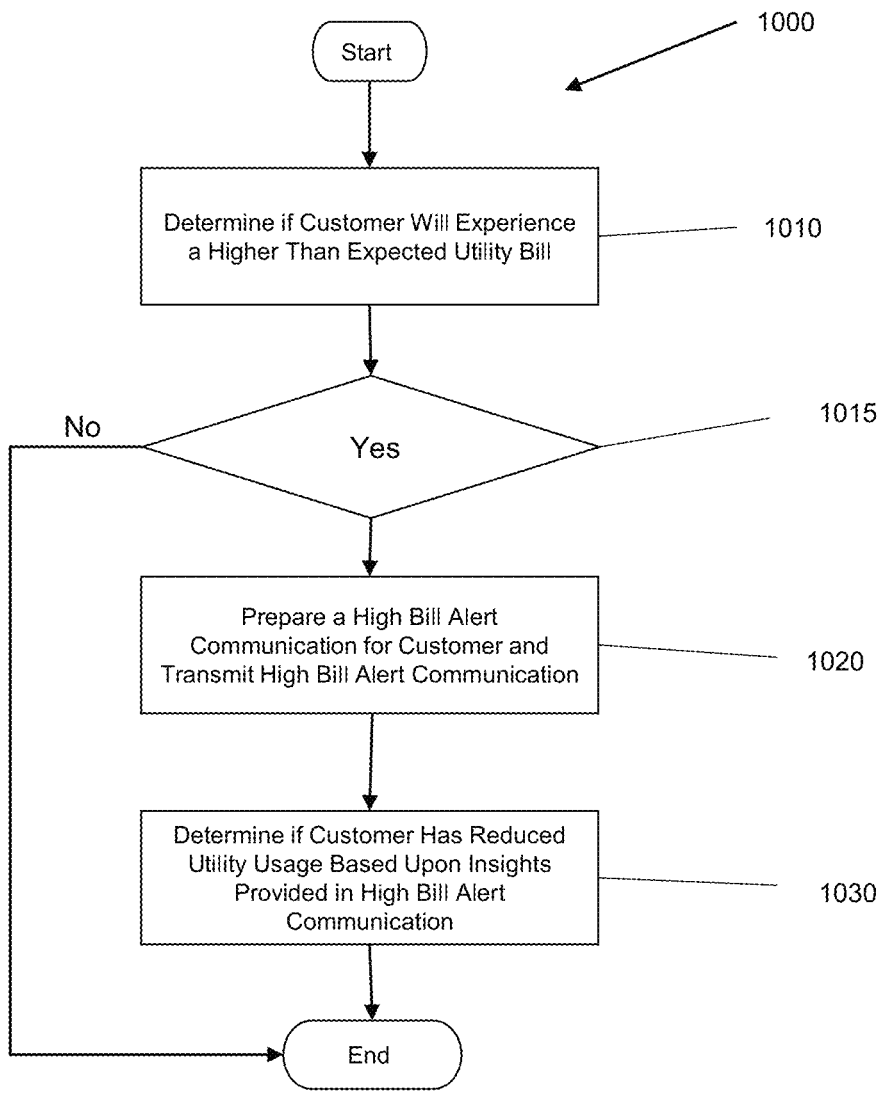
FIG. 10 illustrates a method for providing a high bill alert to a customer, according to one embodiment of the present system/method.

FIG. 10 illustrates an exemplary embodiment of creating and transmitting a high bill alert/resource consumption report 700 to reduce resource consumption. As shown in FIG. 10, the method begins at block 1010 where the resource consumption data of that customer is received and reviewed by the resource management system 105 to determine if the customer is likely to exceed a resource consumption threshold and, therefore, experience a higher than normal (or expected) utility bill. For example, the resource provider may also inform resource management system 105 that a customer is about to exceed a threshold in resource consumption because the customer is using more electricity than normal. However, it is to be understood that the customer is about to exceed the resource consumption threshold can be predicted in numerous ways. For example, recurring high bill alerts may be known from previous history. Alternatively, in some embodiments, a high bill alert can be predicted based on analyzing resource consumption data and/or non-resource consumption data to identify patterns and/or factors that indicate that a high bill alert is likely. This can include trends in resource consumption, weather forecast/s, and/or behavior models of individual/group user behavior, etc.

At block 1015, it is determined by the resource management system 105 that the customer is about to exceed a resource consumption threshold. If it is determined that the customer is not about to exceed a resource consumption threshold the process ends. Otherwise, the process proceeds to block 1020.

At block 1020, the high bill alert/resource consumption report 700 is prepared and transmitted to the customer if it is determined by the resource management system 105 that the customer is about to exceed a resource consumption threshold. As discussed earlier, the high bill alert/resource consumption report 700 should contain information regarding the current resource consumption of the customer such as the electricity usage by that customer as obtained by the resource management system 105 from the resource provider such as an electricity provider. The high bill alert/resource consumption report 700 can be a message that includes resource consumption data and encourages consumers to reduce resource consumption.

At block 1030, the resource management system 105 then interacts with the resource provider to determine if the customer has reduced his/her resource consumption from one time interval to another time interval after the transmittal of the high bill alert/resource consumption report 700.

It is to be understood that the high bill alert/resource consumption report 700 can also include resource consumption data detailing the resource consumption of the individual customer. This can include details regarding resource consumption as well reduction in resource consumption by the individual consumer. Finally, the high bill alert/resource consumption report 700 can also include suggestions (insights) on how the customer can reduce his/her resource consumption.

It is to be further understood that the generated high bill alert/resource consumption report 700 can be transmitted to the appropriate customers using one or more channels such as e-mail, text message, instant message, etc. In some embodiments, a resource consumption report 700 can be transmitted to a consumer using a preferred communication channel selected by the customer.

Figure 11:
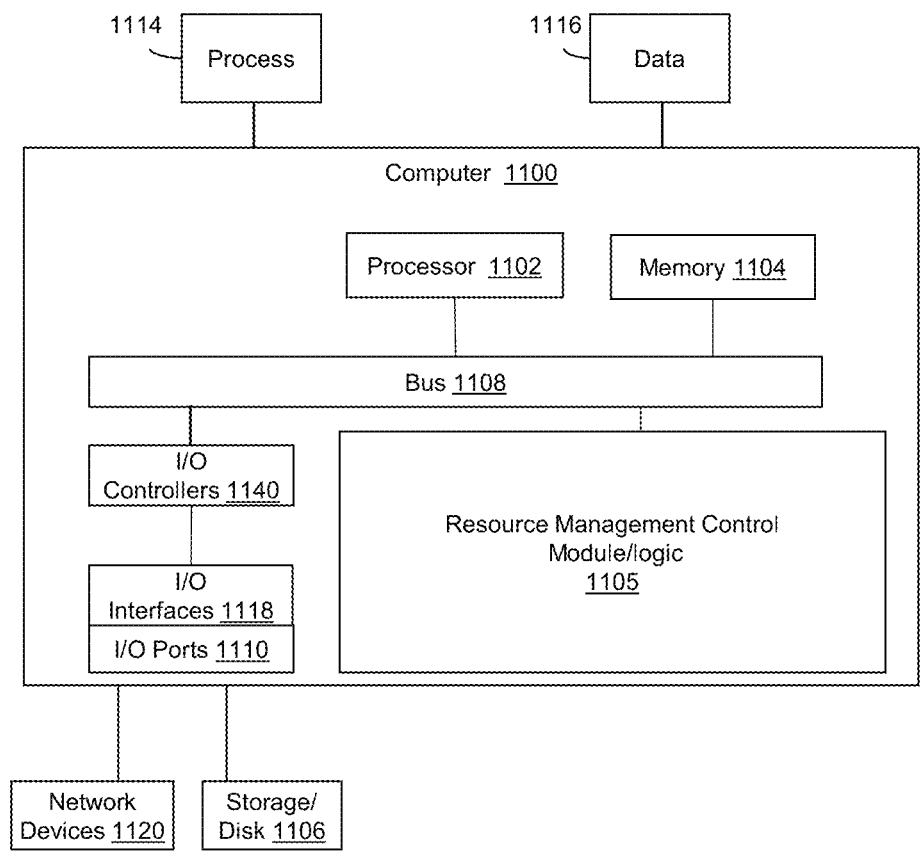
FIG. 11 illustrates an embodiment of a special purpose computing system configured with the example systems and/or methods disclosed.

FIG. 11 illustrates an example special purpose computing device that is configured and/or programmed with one or more of the example systems and methods described herein, and/or equivalents. The example computing device may be a computer 1100 that includes a processor 1102, a memory 1104, and input/output ports 1110 operably connected by a bus 1108. In one example, the computer 1100 may include a resource management control module/logic 1105 configured to facilitate managing of customer resource consumption architecture, as performed by the methods of FIGS. 1-10. In one example, the logic 1105 may be implemented in hardware, a non-transitory computer-readable medium with stored instructions, firmware, and/or combinations thereof. While the logic 1105 is illustrated as a hardware component attached to the bus 1108, it is to be appreciated that in other embodiments, the logic 1105 could be implemented in the processor 1102, stored in memory 1104, or stored in disk 1106.

In one embodiment, logic 1105 or the computer is a means (e.g., structure: hardware, non-transitory computer-readable medium, firmware) for performing the actions described. In some embodiments, the computing device may be a special purpose server operating in a cloud computing system, a server configured in a Software as a Service (SaaS) architecture, a smart phone, laptop, tablet computing device, and so on.

Describing an example configuration of the computer 1100, the processor 1102 may be a variety of various specially programmed processors including dual microprocessor and other multi-processor architectures. A memory 1104 may include volatile memory and/or non-volatile memory. Non-volatile memory may include, for example, ROM, PROM, and so on. Volatile memory may include, for example, RAM, SRAM, DRAM, and so on.

A storage disk 1106 may be operably connected to the computer 1100 via, for example, an input/output (I/O) interface (e.g., card, device) 1118 and an input/output port 1110. The disk 1106 may be, for example, a magnetic disk drive, a solid-state disk drive, a floppy disk drive, a tape drive, a Zip drive, a flash memory card, a memory stick, and so on. Furthermore, the disk 1106 may be a CD-ROM drive, a CD-R drive, a CD-RW drive, a DVD ROM, and so on. The memory 1104 can store a process 1114 and/or a data 1116, for example. The disk 1106 and/or the memory 1104 can store an operating system that controls and allocates resources of the computer 1100.

The computer 1100 may interact with input/output (I/O) devices via the I/O interfaces 1118 and the input/output ports 1110. Input/output devices may be, for example, a keyboard, a microphone, a pointing and selection device, cameras, video cards, displays, the disk 1106, the network devices 1120, and so on. The input/output ports 1110 may include, for example, serial ports, parallel ports, and USB ports.

The computer 1100 can operate in a network environment and thus may be connected to the network devices 1120 via the I/O interfaces 1118, and/or the I/O ports 1110. Through the network devices 1120, the computer 1100 may interact with a network. Through the network, the computer 1100 may be logically connected to remote computers. Networks with which the computer 1100 may interact include, but are not limited to, a LAN, a WAN, and other networks.

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A system for reducing a consumer's resource consumption throughout a time period comprising:
    a processor; and
    a memory coupled with and readable by the processor and storing a set of instructions configured with a resource management control module which, when executed by the processor, causes the processor to:
        define a behavioral load shaping program that includes a series of coordinated communications that are transmitted to a consumer over the time period at communication intervals, wherein a coordinated communication is generated to have content that is different from a previous coordinated communication and based at least on feedback data, wherein the content of the series of coordinated communications includes a series of coordinated resource consumption reports and suggestions for the consumer;
        receive, by the resource management control module, a first resource consumption data for the consumer of a resource from a resource monitoring device;
        wherein the resource monitoring device includes a utility meter;
        receive, by the resource management control module, i) a first set of data from a customer insights module and ii) a first set of data from a device associated with the consumer;
        generate, by the resource management control module, a first resource consumption report of the series of coordinated resource consumption reports for transmission to the consumer based upon i) the first resource consumption data, ii) the first set of data from the customer insights module, and iii) the first set of data from the device associated with the consumer, wherein the first resource consumption report includes a first set of suggestions for reducing resource usage during a peak hours' time range;
        wherein the resource management control module is configured to select the first set of suggestions from an available set of suggestions stored in the memory, wherein each suggestion includes a different suggestion for reducing resource consumption;
        transmit, by the resource management control module, the first resource consumption report to a location associated with the consumer;
        wherein the first resource consumption report and the first set of suggestions are transmitted at a first communication interval based on the communication intervals of the series of coordinated communications;
        subsequent to transmitting the first resource consumption report, receive, by the resource management control module, i) a second resource consumption data for the consumer of the resource from the resource monitoring device, ii) a second set of data from the customer insights module, and iii) a second set of data from the device associated with the consumer;
        determine, by the resource management control module, if the consumer has reduced the resource consumption during peak hours' time range from the first resource consumption report based upon i) the second resource consumption data for the consumer of the resource from the resource monitoring device, ii) the second set of data from the customer insights module, and iii) the second set of data from the device associated with the consumer;
        in response to determining that the consumer did not reduce the resource consumption:
            i) set, by the resource management control module, a condition that the first set of suggestions was not effective in changing consumption behavior of the consumer, and
            ii) generate, by the resource management control module, a second report of the series of resource consumption reports that includes a second set of suggestions selected from the set of available suggestions that is different than the first set of suggestions;
        transmit, by the resource management control module, the second report to the location associated with the consumer to cause a reduction in resource consumption, and repeat, by the resource management control module, determining whether the resource consumption of the consumer is reduced subsequent to the second report including the second set of suggestions;
        wherein the second report is transmitted at a second communication interval based on the communication intervals of the series of coordinated communications;
        wherein each time the resource management control module determines that a previously selected suggestion does not cause a reduction in the resource consumption by the consumer, the resource management control module selects a different suggestion from the set of available suggestions for a subsequent report in subsequent time intervals continuously over at least a year-long time period to establish the series of coordinated resource consumption reports;

access, by the resource management control module, i) a third resource consumption data, from the resource monitoring device, for the consumer of the resource, ii) a third set of data from the customer insights module, and iii) a third set of data from the device associated with the consumer to identify whether a reduction in the resource usage occurred subsequent to the second report;
determine, by the resource management control module, an amount of resource consumption that was reduced in relation to the second report based upon i) the third resource consumption data, ii) the third set of data from the customer insights module, and iii) the third set of data from the device associated with the consumer;
in response to determining that the consumer reduced the resource consumption, generate, by the resource management control module, a third report in the series of coordinated resource consumption reports, wherein the third report includes information regarding the amount of the resource consumption that was reduced in relation to the second report and includes a third set of suggestions selected from the set of available suggestions that is different than the first and the second set of suggestions; and
transmit, by the resource management control module, the third report in the series of coordinated resource consumption reports to the location associated with the consumer, and repeat, by the resource management control module, determining whether the resource consumption of the consumer is reduced to continue the series of coordinated communications.

2. The system of claim 1, wherein the first resource consumption report is comprised of:
information regarding a current billing amount that the consumer was charged for consumption of the resource, a peak hours rate and the peak hours' time range, and a non-peak hours rate and a non-peak hours' time range for consumption of the resource by the consumer over a time interval; and
a first seasonal resource consumption report, wherein the first seasonal consumption report includes information related to a comparison of how much resource the consumer used during the peak hours' time range during a first time period and during a second time period.

3. The system of claim 2, wherein the set of instructions is further comprised of instructions that when executed by the processor cause the processor to:
generate an introductory resource consumption report for transmission to the consumer, wherein the introductory resource consumption report includes the information regarding the amount of a resource consumption by the consumer that is associated with the peak hours rate and the peak hours' time range and the non-peak hours rate and the non-peak hours' time range and the information regarding how the consumer can reduce the resource consumption by consuming less of the resource during the peak hours.

4. The system of claim 2, wherein the set of instructions is further comprised of instructions that when executed by the processor cause the processor to:
determine a change in the peak hours rate and the peak hours' time range and the non-peak hours rate and the non-peak hours' time range; and
generate an change in peak hours resource consumption report for transmission to the consumer, wherein the change in peak hours resource consumption report includes information regarding the change in the peak hours rate and peak hours' time range and non-peak hours rate and non-peak hours' time range, a cost difference associated with the change in peak hours rate and non-peak hours rate, and information regarding how the consumer can reduce the resource consumption by consuming less of the resource during the peak hours.

5. The system of claim 4, wherein the instructions to determine the change in peak hours resource consumption report is further comprised of:
determine an upcoming change associated with the peak hours rate and the peak hours' time range and the non-peak hours rate and the non-peak hours' time range; and
prepare an upcoming change in peak hours resource consumption report for transmission to the consumer, wherein the upcoming change in peak hours resource consumption report includes information regarding an upcoming change in the peak hours rate and peak hours' time range and non-peak hours rate and non-peak hours' time range, a cost difference associated with the upcoming change in peak hours rate and non-peak hours rate, and information regarding how the consumer can reduce the resource consumption by consuming less of the resource during the peak hours.

6. The system of claim 2, wherein the set of instructions is further comprised of instructions that when executed by the processor cause the processor to:
determine if an amount of the current billing amount of a resource exceeds a billing amount threshold for the consumer; and
in response to determining that the current billing amount of a resource exceeds a billing amount threshold, prepare a high bill alert resource consumption report for transmission to the consumer, wherein the high bill alert resource consumption report includes the information regarding the determination that the amount of the current billing amount of a resource exceeds the billing amount threshold and the information regarding how the consumer can reduce the resource consumption by consuming less of the resource during the peak hours.

7. A computer-implemented method performed by a computing device executing a consumer resource consumption management module for reducing a consumer's resource consumption throughout a time period, the method comprising:
displaying a graphical user interface associated with a customer resource consumption management module, wherein the customer resource consumption management module is associated with a computer application running on a computing device comprising a processor for executing instructions from a memory including instructions of the customer resource consumption management module;
in response to user interaction with the graphical user interface, defining a behavioral load shaping program that includes a series of coordinated communications that are transmitted to a consumer over the time period at communication intervals, wherein a coordinated communication is generated to have content that is different from a previous coordinated communication and based at least on feedback data, wherein the content of the series of coordinated communications includes a series of coordinated resource consumption reports and suggestions for the consumer;

receiving, by the consumer resource consumption management module, a first resource consumption data for the consumer of a resource from a resource monitoring device, wherein the resource monitoring device includes a utility meter;

receiving, by the consumer resource consumption management module, i) a first set of data from a customer insights module and ii) a first set of data from a device associated with the consumer;

generating, by the consumer resource consumption management module, a first resource consumption report of the series of coordinated resource consumption reports for transmission to the consumer based upon i) the first resource consumption data, ii) the first set of data from the customer insights module, and iii) the first set of data from the device associated with the consumer, wherein the first resource consumption report includes a first set of suggestions for reducing resource usage during a peak hours' time range, wherein the consumer resource consumption management module is configured to select the first set of suggestions from an available set of suggestions stored in the memory, wherein each suggestion includes a different suggestion for reducing resource consumption;

transmitting, by the consumer resource consumption management module, the first resource consumption report to a location associated with the consumer;

wherein the first resource consumption report and the first set of suggestions are transmitted at a first communication interval based on the communication intervals of the series of coordinated communications;

subsequent to transmitting the resource first consumption report, receiving, by the consumer resource consumption management module, i) a second resource consumption data for the consumer of the resource from the resource monitoring device, ii) a second set of data from the customer insights module, and iii) a second set of data from the device associated with the consumer;

determining, by the consumer resource consumption management module, if the consumer has reduced the resource consumption during the peak hours' time range from the first resource consumption report based upon i) the second resource consumption data for the consumer of the resource from the resource monitoring device, ii) the second set of data from the customer insights module, and iii) the second set of data from the device associated with the consumer;

in response to determining that the consumer did not reduce the resource consumption:
  i) setting, by the consumer resource consumption management module, a condition that the first set of suggestions was not effective in changing consumption behavior of the consumer, and
  ii) generating, by the consumer resource consumption management module, a second report of the series of resource consumption reports at a second communication interval that includes a second set of suggestions selected from the set of available suggestions that is different than the first set of suggestions;

transmitting, by the consumer resource consumption management module, the second report to the location associated with the consumer and repeating, by the consumer resource consumption management module, determining whether the resource consumption of the consumer is reduced subsequent to the second report including the second set of suggestions;

wherein each time the consumer resource consumption management module determines that a previously selected suggestion does not cause a reduction in the resource consumption by the consumer, the consumer resource consumption management module selects a different suggestion from the set of available suggestions for a subsequent report in subsequent time intervals continuously over at least a year-long time period to establish the series of coordinated resource consumption reports;

accessing, by the consumer resource consumption management module, i) a third resource consumption data, from the resource monitoring device, for the consumer of the resource, ii) a third set of data from the customer insights module, and iii) a third set of data from the device associated with the consumer to identify whether a reduction in the resource usage occurred subsequent to the second report;

determining, by the consumer resource consumption management module, an amount that the consumer saved on resource consumption costs in relation to the second report based upon i) the third resource consumption data, ii) the third set of data from the customer insights module, and iii) the third set of data from the device associated with the consumer;

in response to determining the amount that the consumer reduced on resource consumption, generating, by the consumer resource consumption management module, a third report in the series of coordinated resource consumption reports, wherein the third report includes information regarding the amount of resource consumption that was reduced in relation to the second report and includes a third set of suggestions selected from the set of available suggestions that is different than the first and the second set of suggestions; and transmitting at a third communication interval, by the consumer resource consumption management module, the third report in the series of coordinated resource consumption reports to the location associated with the consumer, and repeating, by the consumer resource consumption management module, determining whether the resource consumption of the consumer is reduced to continue the series of coordinated communications.

8. The computer-implemented method of claim 7, wherein the resource consumption data for a consumer of a resource is further comprised of:
information regarding a current billing amount that the consumer was charged for consumption of the resource, a peak hours rate and the peak hours' time range, and a non-peak hours rate and a non-peak hours' time range for consumption of the resource by the consumer over a time interval.

9. The computer-implemented method of claim 7, wherein the first resource consumption report is further comprised of:
a first seasonal resource consumption report, wherein the first seasonal consumption report includes information related to a comparison of how much resource the consumer used during the peak hours' time range during a first time period and during a second time period.

10. The computer-implemented method of claim 8, wherein the method further comprising:

generating an introductory resource consumption report for transmission to the consumer, wherein the introductory resource consumption report includes the information regarding the amount of a resource consumption by the consumer that is associated with the peak hours rate and the peak hours' time range and the non-peak hours rate and the non-peak hours' time range and the information regarding how the consumer can reduce the resource consumption by consuming less of the resource during the peak hours.

11. The computer-implemented method of claim 8, further comprising:
  determining a change in the peak hours rate and the peak hours' time range and the non-peak hours rate and the non-peak hours' time range; and
  generating a change in peak hours resource consumption report for transmission to the consumer, wherein the change in peak hours resource consumption report includes information regarding the change in the peak hours rate and peak hours' time range and non-peak hours rate and non-peak hours' time range, a cost difference associated with the change in peak hours rate and non-peak hours rate, and information regarding how the consumer can reduce the resource consumption by consuming less of the resource during the peak hours.

12. The computer-implemented method of claim 11, wherein preparing the change in peak hours resource consumption report is further comprised of:
  determining an upcoming change associated with the peak hours rate and the peak hours' time range and the non-peak hours rate and the non-peak hours' time range; and
  generating an upcoming change in peak hours resource consumption report for transmission to the consumer, wherein the upcoming change in peak hours resource consumption report includes information regarding an upcoming change in the peak hours rate and peak hours' time range and non-peak hours rate and non-peak hours' time range, a cost difference associated with the upcoming change in peak hours rate and non-peak hours rate, and information regarding how the consumer can reduce the resource consumption by consuming less of the resource during the peak hours.

13. The computer-implemented method of claim 8, wherein the method further comprises:
  determining if an amount of the current billing amount of a resource exceeds a billing amount threshold for the consumer; and
  in response to determining that the current billing amount of a resource exceeds the billing amount threshold, generating a high bill alert resource consumption report for transmission to the consumer, wherein the high bill alert resource consumption report includes the information regarding the determination that the amount of the current billing amount of a resource exceeds the billing amount threshold and the information regarding how the consumer can reduce the resource consumption by consuming less of the resource during the peak hours.

14. A non-transitory computer-readable medium storing computer-executable instructions configured as a resource management control module that when executed by at least a processor of a computer cause the computer to:
  define a behavioral load shaping program that includes a series of coordinated communications that are transmitted to a plurality of consumers over a time period at communication intervals, wherein a coordinated communication is generated to have content that is different from a previous coordinated communication and based at least on feedback data;
  wherein each of the plurality consumers is associated with a dwelling connected to an electrical power system that draws electricity from the electrical power system;
  wherein the series of coordinated communications for a given consumer of the plurality of consumers includes a series of coordinated electricity consumption reports for the given consumer;
  wherein the series of coordinated communications that are transmitted to the plurality of consumers includes content to cause a reduction of electricity consumption in order to reduce occurrences of power overload or blackouts on the electrical power system;
  for each given consumer from the plurality of consumers:
  receive, by a resource management control module, a first electricity consumption data for the consumer from a resource monitoring device,
  wherein the resource monitoring device includes a utility meter;
  receive, by the resource management control module, a first set of data from a customer insights module;
  generate, by the resource management control module, a first electricity consumption report of the series of coordinated electricity consumption reports for transmission to the given consumer based upon the first electricity consumption data, wherein the first electricity consumption report includes a first set of suggestions for reducing electricity usage during a peak hours' time range,
  wherein the resource management control module is configured to select the first set of suggestions from an available set of suggestions stored in the memory, wherein each suggestion includes a different suggestion for reducing electricity consumption;
  transmit, by the resource management control module, the first electricity consumption report to a location associated with the consumer at a first communication internal period based on the communication intervals of the series of coordinated communications;
  subsequent to transmitting the first electricity consumption report, receive, by the resource management control module, a second electricity consumption data for the consumer from the resource monitoring device;
  determine, by the resource management control module, based upon the second electricity consumption data for the given consumer from the resource monitoring device, if the given consumer has reduced the electricity consumption during the peak hours' time range from the first electricity consumption report;
  in response to determining that the given consumer did not reduce the electricity consumption, i) set, by the resource management control module, a condition that the first set of suggestions was not effective in changing electricity consumption behavior of the consumer, and ii) generate, by the resource management control module, a second report of the series of electricity consumption reports at a second communication interval that includes a second set of suggestions selected from the set of available suggestions that is different than the first set of suggestions;
  transmit, by the resource management control module, the second report to the location associated with the consumer and repeat, by the resource management control module, determining whether the electricity consumption of the consumer is reduced subsequent to the second report including the second set of suggestions;

wherein each time the resource management control module determines that a previously selected suggestion does not cause a reduction in the electricity consumption by the consumer, the resource management control module is configured to select a different suggestion from the set of available suggestions for a subsequent report in subsequent time intervals continuously over at least a year-long time period to establish the series of coordinated electricity consumption reports;

access, by the resource management control module, i) a third electricity consumption data, from the resource monitoring device, for the given consumer of the resource to identify whether a reduction in the electricity usage occurred subsequent to the second report;

determine, by the resource management control module, an amount of electricity consumption that was reduced in relation to the second report based upon i) the third electricity consumption data;

in response to determining that the consumer reduced the electricity consumption, generate, by the resource management control module, a third report in the series of coordinated electricity consumption reports, wherein the third report includes information regarding the amount of the electricity consumption that was reduced in relation to the second report and includes a third set of suggestions selected from the set of available suggestions that is different than the first and the second set of suggestions; and transmit, by the resource management control module, the third report in the series of coordinated electricity consumption reports to the location associated with the consumer, and repeat, by the resource management control module, determining whether the electricity consumption of the consumer is reduced to continue the series of coordinated communications.

15. The non-transitory computer-readable medium of claim 14, wherein the electricity consumption data for a consumer is further comprised of:

information regarding a current billing amount that the consumer was charged for consumption of the electricity, a peak hours rate and the peak hours' time range, and a non-peak hours rate and a non-peak hours' time range for consumption of the electricity by the consumer over a time interval.

16. The non-transitory computer-readable medium of claim 14, wherein the first electricity consumption report is further comprised of:

a first seasonal electricity consumption report, wherein the first seasonal electricity consumption report includes information related to a comparison of how much electricity the consumer used during the peak hours' time range during a first time period and during a second time period.

17. The non-transitory computer-readable medium of claim 15, wherein the medium is further comprised of computer-executable instructions that when executed cause the processor to:

generate an introductory electricity consumption report for transmission to the consumer, wherein the introductory electricity consumption report includes the information regarding the amount of electricity consumption by the consumer that is associated with the peak hours rate and the peak hours' time range and the non-peak hours rate and the non-peak hours' time range and the information regarding how the consumer can reduce the electricity consumption by consuming less electricity during the peak hours.

18. The non-transitory computer-readable medium of claim 15, wherein the medium is further comprised of computer-executable instructions that when executed cause the processor to:

determine a change in the peak hours rate and the peak hours' time range and the non-peak hours rate and the non-peak hours' time range; and generate a change in peak hours electricity consumption report for transmission to the consumer, wherein the change in peak hours electricity consumption report includes information regarding the change in the peak hours rate and peak hours' time range and non-peak hours rate and non-peak hours' time range, a cost difference associated with the change in peak hours rate and non-peak hours rate, and information regarding how the consumer can reduce the electricity consumption by consuming less electricity during the peak hours.

19. The non-transitory computer-readable medium of claim 15, wherein computer-executable instructions for generating the change in peak hours electricity consumption report further comprise computer-executable instructions that when executed cause the processor to:

determine an upcoming change associated with the peak hours rate and the peak hours' time range and the non-peak hours rate and the non-peak hours' time range; and generate an upcoming change in peak hours electricity consumption report for transmission to the consumer, wherein the upcoming change in peak hours electricity consumption report includes information regarding an upcoming change in the peak hours rate and peak hours' time range and non-peak hours rate and non-peak hours' time range, a cost difference associated with the upcoming change in peak hours rate and non-peak hours rate, and information regarding how the consumer can reduce the electricity consumption by consuming less electricity during the peak hours.

* * * * *

UNITED STATES PATENT AND TRADEMARK OFFICE
CERTIFICATE OF CORRECTION

PATENT NO. : 11,720,910 B2
APPLICATION NO. : 16/658836
DATED : August 8, 2023
INVENTOR(S) : Rabison et al.

It is certified that error appears in the above-identified patent and that said Letters Patent is hereby corrected as shown below:

In the Specification

In Column 18, Line 66, delete "campaign" and insert -- campaign. --, therefor.

In Column 24, Line 49, delete "ion.".

In Column 27, Line 17, delete "on)." and insert -- on. --, therefor.

In the Claims

In Column 29, Line 38, in Claim 1, delete "with" and insert -- as --, therefor.

In Column 30, Line 2, in Claim 1, delete "range;" and insert -- range: --, therefor.

In Column 30, Line 27, in Claim 1, after "during" insert -- the --, therefor.

Signed and Sealed this
Twenty-eighth Day of May, 2024

Katherine Kelly Vidal
*Director of the United States Patent and Trademark Office*